(12) United States Patent  
Imamura

(10) Patent No.: US 6,185,043 B1
(45) Date of Patent: Feb. 6, 2001

(54) OPTICAL SYSTEM HAVING DIFFRACTIVE OPTICAL ELEMENT AND IMAGE PICKUP APPARATUS HAVING DIFFRACTIVE OPTICAL ELEMENT

(75) Inventor: Ayami Imamura, Hachioji (JP)

(73) Assignee: Olympus Optical Co., Ltd., Tokyo (JP)

( * ) Notice: Under 35 U.S.C. 154(b), the term of this patent shall be extended for 0 days.

(21) Appl. No.: 09/159,224

(22) Filed: Sep. 23, 1998

(30) Foreign Application Priority Data

Jan. 14, 1998 (JP) .................................................. 10-005681

(51) Int. Cl.[7] ............................ G02B 27/10; G02B 27/44
(52) U.S. Cl. ............................................. 359/619; 359/566
(58) Field of Search .................................. 359/618, 566, 359/569, 571, 574

(56) References Cited

U.S. PATENT DOCUMENTS 5,114,513 * 5/1992 Hosokawa et al. ................. 156/150
5,359,684 * 10/1994 Hosokawa et al. .................. 385/33
5,513,289 * 4/1996 Hosokawa et al. .................. 385/33
5,847,877 * 12/1998 Imamura et al. ................... 359/566

FOREIGN PATENT DOCUMENTS 2-43503   2/1990 (JP) .

* cited by examiner

*Primary Examiner*—Ricky Mack
(74) *Attorney, Agent, or Firm*—Pillsbury Madison & Sutro LLP

(57) ABSTRACT

An optical system capable of preventing degradation of the image quality and minimizing the effect of unwanted-order light even when a protective layer is provided on a diffraction surface, thereby obtaining an image of high quality. The optical system, on which band light is incident, has a relief type diffractive optical element (2), and a device (3) that limits a wavelength band of light entering or emerging from the diffractive optical element (2). The diffractive optical element (2) has an optical member (4) having a relief configuration on a surface thereof, and a protective layer (5) formed over the surface of the optical member (4) from a material different from a material constituting the optical member (4).

18 Claims, 16 Drawing Sheets

ND IMAGE PICKUP
OPTICAL SYSTEM HAVING DIFFRACTIVE OPTICAL ELEMENT AND IMAGE PICKUP APPARATUS HAVING DIFFRACTIVE OPTICAL ELEMENT

BACKGROUND OF THE INVENTION

The present invention relates to an optical system and an image pickup apparatus including the same. More particularly, the present invention relates to an optical system which includes a relief type diffractive optical element having a protective layer provided on a relief surface and on which band light is incident. The present invention also relates to an image pickup apparatus including the optical system.

Recently, diffractive optical elements, particularly relief type diffractive optical elements, have been widely used for the purpose of correcting aberrations and achieving compact optical systems. As shown in the sectional view of FIG. 1, a typical relief type diffractive optical element diffracts light by a relief pattern that is formed on a surface thereof with a depthwise structure. The relief pattern consists of very fine pattern elements. When visible light is used, the relief pattern pitch is generally of the order of from several microns to several hundred microns.

Because of the fine pattern formed thereon, the surface of the relief type diffractive optical element is readily stained. That is, dust or other foreign matter is likely to collect in the bottoms of the grooves. Unlike ordinary refracting lenses, it is difficult to remove stains, e.g. fingerprints, from the surface of the relief type diffractive optical element. Projections that constitute the relief pattern are readily chipped and hence fragile. For this reason, when such a diffractive optical element is used in an image pickup optical system of a camera, for example, the diffraction surface provided with a relief pattern cannot be placed at a first surface on the object side.

One approach to solve such a problem is to form a protective layer on the diffraction surface so as to level the surface. In Japanese Patent Application Unexamined Publication (KOKAI) No. 2-43503, for example, a protective layer is provided on a grating layer that has a relief grating pattern formed on a surface thereof to level the pattern surface.

However, when a protective layer is formed on a diffraction surface, the optical performance may be degraded. In an optical system using such a diffractive optical element, intense flare or ghost is likely to appear, causing the image quality to be degraded.

The relief type diffractive optical element has the nature that the diffraction efficiency for a certain order of diffracted light reaches a maximum at a certain wavelength with respect to a certain groove depth of the relief configuration, and the diffraction efficiency for that order of diffracted light reduces as the wavelength deviates from that wavelength. In the case of a diffractive optical element having a sawtooth sectional configuration as shown in part (a) of FIG. 1, for example, the diffraction efficiency for m-th order light at wavelength $\lambda_0$ reaches 100% when the diffractive optical element is placed in the air and the groove depth d satisfies the following equation (10):

$$d = m\lambda_0 / \{n_1(\lambda_0) - 1\} \qquad (10)$$

where $n_1(\lambda_0)$ is the refractive index at the wavelength $\lambda_0$ of the material constituting the relief surface of the diffractive optical element. The wavelength $\lambda_0$ at which the diffraction efficiency reaches a maximum will be hereinafter referred to as "optimization wavelength".

FIG. 2 shows the diffraction efficiency for first-order light in a visible wavelength region when the optimization wavelength $\lambda_0$ is 510 nanometers. In this case, the diffractive optical element is assumed to be formed from BSL7 (manufactured by OHARA K. K.; $n_d$=1.51633, and $v_d$=64.1). As will be clear from FIG. 2, the diffraction efficiency is 100% at a wavelength is 510 nanometers, but it reduces in longer and shorter wavelength regions. In these regions, a quantity of light corresponding to the reduction in the diffraction efficiency appears as other orders of diffracted light, mainly zero-order light and second-order light. FIG. 3 shows the diffraction efficiencies for zero-order light and second-order light in the case of the optimization wavelength $\lambda_0$. For zero-order light, the diffraction efficiency increases in the long wavelength region; for second-order light, the diffraction efficiency increases in the short wavelength region.

Accordingly, if light having a wide wavelength range, i.e. white light, is made incident on the diffractive optical element, unwanted orders of diffracted light (in this case, mainly zero-order light and second-order light) other than a working order of diffracted light (in this case, first-order light) used for image formation occur, causing flare or ghost. Consequently, the image quality is degraded.

Let us consider a case where, as shown in FIG. 4, a protective layer made of a material different from the material constituting the relief type diffractive optical element is formed on the diffraction surface of the diffractive optical element. Assuming that the refractive index of the material constituting the protective layer is $n_2$, it is necessary for the groove depth d' to satisfy the following equation (11) in order to allow the diffraction efficiency for m-th order of diffraction to reach 100% at the optimization wavelength $\lambda_0$ as in the case of the diffractive optical element having no protective layer:

$$d' = m\lambda_0 / \{n_1(\lambda_0) - n_2(\lambda_0)\} \qquad (11)$$

In a case where the relief type diffractive optical element is formed from BSL7 and the protective layer is PC (polycarbonate), for example, if the optimization wavelength $\lambda_0$ is 510 nanometers, the diffraction efficiency for first-order light in a visible wavelength region is such as that shown by curve ① in FIG. 5. It should be noted that curve ② in the figure represents the diffraction efficiency for first-order light in a case where a protective layer is not provided, which is the same as the curve in FIG. 2. As will be clear from FIG. 5, when a protective layer is provided, the diffraction efficiency also reduces as the wavelength deviates from the optimization wavelength, and the rate of reduction in the diffraction efficiency is higher than in the case of the diffractive optical element having no protective layer. The rate of reduction in the diffraction efficiency is particularly high in the short wavelength region. The diffraction efficiencies for zero-order light and second-order light are such as those shown in FIG. 6. The diffraction efficiencies for zero-order light and second-order light increase by an amount corresponding to the reduction in the diffraction efficiency for first-order light.

Thus, when a protective layer is provided on a diffraction surface of a relief type diffractive optical element, the wavelength dependence of the diffraction efficiency increases. Consequently, it is likely that the diffraction efficiency for a working order of diffracted light used for image formation will reduce in short and long wavelength regions with respect to the optimization wavelength and that the diffraction efficiency for unwanted orders of diffracted light, which are unnecessary for image formation, will increase in the short and long wavelength regions. Accordingly, provision of a protective layer may enhance the adverse effect of unwanted-order light on the image. That is, it may intensify flare or ghost, causing the degradation of the image quality to be aggravated.

SUMMARY OF THE INVENTION

In view of the above-described circumstances, an object of the present invention is to provide an optical system capable of preventing degradation of the image quality and minimizing the effect of unwanted-order light even when a protective layer is provided on a diffraction surface, thereby obtaining an image of high quality. Another object of the present invention is to provide an image pickup apparatus including the optical system.

To attain the above-described object, the present invention provides an optical system on which band light is incident. The optical system has a relief type diffractive optical element, and a wavelength band limiting device that limits a wavelength band of light entering or emerging from the relief type diffractive optical element. The relief type diffractive optical element has an optical member having a relief configuration on a surface thereof, and a protective layer formed over the surface of the optical member. The protective layer is made of a material different from a material constituting the optical member.

The optical system arranged as stated above corresponds to first to third embodiments (described later) of the optical system according to the present invention.

The above-described optical system has a relief type diffractive optical element and a wavelength band limiting device. The relief type diffractive optical element has an optical member having a relief configuration on a surface thereof as a diffraction surface, and a protective layer formed over the surface of the optical member from a material different from a material constituting the optical member. Accordingly, when band light, e.g. white light, is incident on the relief type diffractive optical element, the light is diffracted by the diffraction surface. At this time, unwanted orders of diffracted light, which are unnecessary for image formation, are produced in addition to a working order of diffracted light, which is necessary for image formation. Because a protective layer is provided on the diffraction surface of the relief type diffractive optical element, unwanted-order light may intensify particularly in the short and long wavelength regions in comparison to a case where no protective layer is provided.

For example, let us consider a case where the optical member having a relief configuration on a surface thereof is formed from BSL7 and the protective layer is PC and where first-order light of visible light is used for image formation. In this case, if the optimization wavelength is 510 nanometers, the diffraction efficiency for first-order light is such as that shown in FIG. 5, and the diffraction efficiencies for zero-order light and second-order light, which are unnecessary for image formation, are such as those shown in FIG. 6.

These diffracted beams of light produced by the diffraction surface of the relief type diffractive optical element enter the wavelength band limiting device. The wavelength band limiting device reduces the effect of unwanted orders of diffracted light, which are unnecessary for image formation, among the diffracted light produced by the diffraction surface of the relief type diffractive optical element. Let us assume that the wavelength band limiting device has a transmittance distribution as shown in FIG. 7, for example. In this case, the transmittance is low in wavelength regions where the intensity of unwanted-order light is high. Therefore, the relative intensity distribution of unwanted-order light passing through the wavelength band limiting device is such as that shown in FIG. 8. Thus, the intensity of unwanted-order light reduces to a considerable extent. It should, however, be noted that the intensity distribution of light incident on the diffraction surface of the relief type diffractive optical element is assumed to be uniform with respect to wavelengths. For the relative values of intensity, the intensity of light before it is incident on the diffraction surface of the relief type diffractive optical element is assumed to be 1.

On the other hand, first-order light, which is necessary for image formation passes through the wavelength band limiting device without a substantial change in the intensity distribution with respect to wavelengths. The intensity of first-order light slightly weakens as a whole, however, because the transmittance of the wavelength band limiting device is high in the working wavelength band, that is, a visible wavelength region, and it is approximately flat with respect to wavelengths in the working wavelength band.

It will be understood from the foregoing description that when diffracted light produced by the diffraction surface of the relief type diffractive optical element passes through the wavelength band limiting device, a working order of diffracted light, which is necessary for image formation, passes efficiently, and unwanted orders of diffracted light, which are unnecessary for image formation, can be removed to a considerable extent.

In the above-described arrangement, the wavelength band limiting device is placed on the light exit side of the diffraction surface of the relief type diffractive optical element. However, the wavelength band limiting device may be placed on the light entrance side of the diffraction surface of the relief type diffractive optical element. In this case, white light from an object point first enters the wavelength band limiting device. The wavelength band limiting device efficiently transmits light in a wavelength band necessary for image formation but removes light in wavelength regions where the diffraction efficiency for unwanted orders of diffracted light, which are unnecessary for image formation, increases. Then, the light passing through the wavelength band limiting device is incident on the diffraction surface of the relief type diffractive optical element. Diffraction at the diffraction surface of the relief type diffractive optical element produces unwanted-order light in addition to a working order of diffracted light, which is necessary for image formation. However, the intensity of light in the wavelength regions where the diffraction efficiency for unwanted-order light increases has already been weakened. Therefore, the intensity of unwanted-order light produced by the diffraction surface is also weak, and the effect of the unwanted-order light on the image is also weak.

In the optical system according to the present invention, a working order of diffracted light, which is necessary for image formation, passes efficiently through the wavelength band limiting device, and unwanted orders of diffracted light, which are unnecessary for image formation, can be removed to a considerable extent by the wavelength band limiting device. Therefore, even when a protective layer is provided on the diffraction surface of the relief type diffractive optical element and hence the effect of unwanted-order light is increased, the effect of unwanted-order light, i.e. flare or ghost, can be reduced efficiently. Accordingly, it is possible to obtain an image of high quality.

Furthermore, it is possible to obtain an optical system exhibiting excellent environmental resistance because the relief type diffractive optical element having a protective layer provided on the diffraction surface can be incorporated into the optical system without degrading the image quality.

Because a protective layer is provided on the diffraction surface, it is possible to place the diffraction surface on the object side when the optical system is used in a telephoto lens system of a camera, for example. Thus, the degree of design freedom increases, and the application range can be enlarged.

The optical system according to the present invention may be arranged such that the wavelength band limiting device includes at least a part of optical elements constituting the optical system other than the relief type diffractive optical element.

The arrangement stated above corresponds to the first embodiment (described later) of the optical system according to the present invention.

In this arrangement, at least a part of optical elements constituting an image-forming optical system other than a relief type diffractive optical element has a wavelength band limiting device.

Let us consider a case where the wavelength band limiting device is placed behind the relief type diffractive optical element as viewed in the order in which light travels. In this case, when band light is incident on the relief type diffractive optical element, the diffraction surface produces a working order of diffracted light, which is necessary for image formation, and unwanted orders of diffracted light, which are unnecessary for image formation. Then, the diffracted light enters the wavelength band limiting device. The wavelength band limiting device removes light in wavelength regions where the diffraction efficiency for unwanted-order light increases. Therefore, the amount of unwanted-order light is reduced to a considerable extent. On the other hand, the order of diffracted light necessary for image formation passes efficiently through the wavelength band limiting device because the device exhibits a high transmittance in a wavelength region where the diffraction efficiency for the working order of diffracted light increases. Accordingly, only the unwanted-order light is removed, and thus the effect of unwanted-order light on the image is reduced.

Although in the foregoing arrangement the relief type diffractive optical element and the wavelength band limiting device are placed in the mentioned order, these elements may be placed in the reverse order.

The wavelength band limiting device is an element separate from the relief type diffractive optical element. Therefore, the diffractive optical element need not be subjected to a special treatment. It is only necessary that the protective layer of the relief type diffractive optical element should be transparent in the working wavelength band.

The working wavelength band can be changed by replacing the wavelength band limiting device with another that limits a different wavelength band, with the relief type diffractive optical element left unchanged. Conversely, the relief type diffractive optical element may be replaced with another, with the wavelength band limiting device left unchanged.

In the above-described arrangement, because the wavelength band limiting device is an element separate from the relief type diffractive optical element, the diffractive optical element need not be subjected to a special treatment. The protective layer also need not be a special one. Accordingly, the relief type diffractive optical element can be readily produced at low cost. Thus, a low-cost image-forming optical system can be obtained.

Furthermore, it is possible to change wavelength bands to be limited without changing the relief type diffractive optical element. Conversely, only the relief type diffractive optical element may be changed without changing the wavelength bands to be limited. Accordingly, it is possible to change only the working wavelength band or to change the image-forming performance without changing the working wavelength band in conformity to each particular purpose. Thus, it is possible to obtain an image-forming optical system that exhibits excellent general-purpose properties.

In a case where the wavelength band limiting device includes at least a part of optical elements constituting the optical system other than the relief type diffractive optical element as stated above, the wavelength band limiting device may include a multilayer film provided on a surface of at least a part of optical elements constituting the optical system other than the relief type diffractive optical element.

The arrangement stated above corresponds to the first embodiment (described later) of the optical system according to the present invention.

In this arrangement, the wavelength band limiting device includes a multilayer film provided on a surface of at least a part of optical elements constituting the optical system other than the relief type diffractive optical element. The optical elements are, for example, a refracting lens and a prism. These are optical elements originally necessary as constituent elements of the optical system. Because a multilayer film is provided on a surface of such an optical element, it is not necessary to add an extra optical member for limiting a wavelength band.

In this arrangement, a multilayer film is provided on a surface of at least a part of optical elements constituting the optical system. Therefore, it is not necessary to add an extra optical element for limiting a wavelength band, and it is possible to obtain a compact optical system having a minimal number of constituent elements.

The above-described optical system according to the present invention may be arranged such that the relief type diffractive optical element has the wavelength band limiting device.

The arrangement stated above corresponds to the second embodiment (described later) of the optical system according to the present invention.

In this arrangement, the relief type diffractive optical element has the wavelength band limiting device. In other words, the wavelength band limiting device is not an element separate from the relief type diffractive optical element, but it is contained in the diffractive optical element.

Band light incident on the relief type diffractive optical element is diffracted by the diffraction surface of the relief type diffractive optical element to produce a working order of diffracted light, which is necessary for image formation, and unwanted orders of diffracted light, which are unnecessary for image formation. At the same time, the intensity of the unwanted-order light is weakened by the wavelength band limiting device, which reduces the intensity of light in wavelength regions where the diffraction efficiency for the unwanted-order light increases. On the other hand, the order of diffracted light used for image formation passes efficiently through the wavelength band limiting device.

Accordingly, from the relief type diffractive optical element, the order of diffracted light necessary for image formation emerges, together with the unwanted-order light whose intensity has been reduced to a considerable extent.

In this arrangement, the relief type diffractive optical element per se has the wavelength band limiting device. Therefore, incident light is diffracted to produce a working order of diffracted light, which is necessary for image formation, and moreover, the effect of unwanted orders of diffracted light, which are unnecessary for image formation, can be reduced by the relief type diffractive optical element alone. Accordingly, another element is not needed to reduce the effect of unwanted-order light, and the optical system can be made compact.

In the above-described arrangement where the relief type diffractive optical element has the wavelength band limiting device, the wavelength band limiting device may be the protective layer of the relief type diffractive optical element.

The arrangement stated above corresponds to the second embodiment (described later) of the optical system according to the present invention.

In this arrangement, the wavelength band limiting device is the protective layer of the relief type diffractive optical element. More specifically, the protective layer of the relief type diffractive optical element protects the diffraction surface. At the same time, the protective layer absorbs light in wavelength regions where the diffraction efficiency for unwanted orders of diffracted light, which are unnecessary for image formation, increases, and transmits light in a wavelength band used for image formation. Accordingly, the effect of unwanted orders of diffracted light unnecessary for image formation can be eliminated simply by forming a protective layer on the diffraction surface.

In this arrangement, the protective layer protects the diffraction surface and, at the same time, it can eliminate the effect of unwanted orders of diffracted light unnecessary for image formation. Therefore, the effect of unwanted-order light can be eliminated simply by providing a protective layer, and a favorable image can be obtained. Accordingly, a relief type diffractive optical element can be produced with ease and at reduced cost, and a low-cost optical system can be obtained.

In the above-described arrangement where the relief type diffractive optical element has the wavelength band limiting device, the wavelength band limiting device may include the protective layer of the relief type diffractive optical element and a multilayer film provided on a surface of the relief type diffractive optical element that is reverse to a side thereof on which the protective layer is provided.

The arrangement stated above corresponds to the second embodiment (described later) of the optical system according to the present invention.

In this arrangement, the wavelength band limiting device includes the protective layer of the relief type diffractive optical element and a multilayer film provided on a surface of the relief type diffractive optical element that is reverse to a side thereof on which the protective layer is provided. Let us assume that the protective layer has a low transmittance in the short wavelength region, for example, of two wavelength regions where the diffraction efficiency for unwanted orders of diffracted light, which are unnecessary for image formation, is high, and that the multilayer film has a low transmittance in the long wavelength region of the two. Consequently, when band light is incident on the relief type diffractive optical element, unwanted-order light for which the diffraction efficiency increases in the short wavelength region is removed by the protective layer, and unwanted-order light for which the diffraction efficiency increases in the long wavelength region is removed by the multilayer film. Accordingly, when the incident light emerges from the optical system, the intensity of unwanted-order light has been reduced to a considerable extent in both the short and long wavelength regions.

Consequently, unwanted-order light that intensifies in the short and long wavelength regions can be removed by the protective layer for the short wavelength region and by the multilayer film for the long wavelength region. Thus, the effect of unwanted-order light on the image can be reduced by two devices operating in the short and long wavelength regions, respectively. Accordingly, a wavelength band for removal of unwanted-order light can be changed independently in each of the short and long wavelength regions by changing the material constituting the protective layer or changing the structure of the multilayer film.

In the above-described arrangement, the protective layer is adapted to reduce the effect of unwanted-order light in the short wavelength region and the multilayer film is adapted to reduce the effect of unwanted-order light in the long wavelength region. Conversely, the protective layer and the multilayer film may be adapted to reduce the effect of unwanted-order light in the long and short wavelength regions, respectively.

In the above-described arrangement, the effect of unwanted-order light in the short wavelength region and that in the long wavelength region are removed by the protective layer and the multilayer film, respectively, which are provided on the relief type diffractive optical element. Therefore, the wavelength band for removal of unwanted-order light can be controlled independently in the short and long wavelength regions. Accordingly, it is possible to change the wavelength bands for removal of unwanted-order light separately in the short and long wavelength regions by changing the material constituting the protective layer or the structure of the multilayer film. Thus, the degree of freedom for setting wavelength bands for removal of unwanted-order light becomes higher than in the case of controlling the wavelength bands by a single device. Consequently, wavelength bands to be limited by the wavelength band limiting device can be set finely in conformity to each particular use application. Accordingly, it is possible to obtain a favorable image that is even fitter for each particular purpose of use.

Each of the protective layer and the multilayer film is required to remove unwanted-order light only in a long or short wavelength region with respect to a certain wavelength. Each of the protective layer and the multilayer film may be set for only one of the long and short wavelength regions irrespective of the other wavelength region. Accordingly, the number of usable materials becomes larger than in the case of removing unwanted-order light in the two wavelength regions by a single device. Thus, implementability increases.

The above-described optical system according to the present invention may be arranged such that the wavelength band limiting device includes the relief type diffractive optical element and at least a part of optical elements constituting the optical system other than the relief type diffractive optical element.

The arrangement stated above corresponds to the third embodiment (described later) of the optical system according to the present invention.

In this arrangement, the wavelength band limiting device includes the relief type diffractive optical element and at least a part of optical elements constituting the optical system other than the relief type diffractive optical element. The relief type diffractive optical element has a low transmittance in one of the short and long wavelength regions where the diffraction efficiency for unwanted orders of diffracted light, which are unnecessary for image formation, increases. At least a part of the optical elements has a low transmittance in the other of the short and long wavelength regions.

In a case where the relief type diffractive optical element and an optical element constituting a part of the wavelength band limiting device are placed successively in the order in which light travels, for example, band light incident on the relief type diffractive optical element is diffracted to produce a working order of diffracted light, which is necessary for image formation, and unwanted orders of diffracted light, which are unnecessary for image formation. First, unwanted-order light in one of the two wavelength regions is removed by the relief type diffractive optical element itself. Next, unwanted-order light in the other wavelength region is removed by the optical element constituting a part of the wavelength band limiting device. Accordingly, light passing through the relief type diffractive optical element and the wavelength band limiting optical element consists essentially of the order of diffracted light necessary for image formation. The intensity of unwanted-order light has been reduced to a considerable extent.

The relief type diffractive optical element and the optical element constituting a part of the wavelength band limiting device may be placed in the order reverse to the above.

As has been stated above, one of the relief type diffractive optical element and the wavelength band limiting optical element limits a short wavelength band, and the other limits a long wavelength band. Accordingly, a wavelength band to be limited by the relief type diffractive optical element can be determined independently of a wavelength band to be limited by the wavelength band limiting optical element, and vice versa.

In this arrangement, wavelength bands to be limited are limited by respective elements for the short and long wavelength regions. Therefore, wavelength bands to be limited can be set independently in the short and long wavelength regions. Consequently, wavelength bands to be limited can be set finely in conformity to each particular use application. Accordingly, it is possible to obtain a favorable image that is even fitter for each particular purpose of use.

One element that limits one of the two wavelength bands can be set independently of the other wavelength band. Accordingly, the degree of freedom is higher than in a case where a single element limits both the wavelength bands. Thus, implementability increases.

In the above-described optical system according to the present invention, the wavelength band limiting device may be arranged to be detachable.

The arrangement stated above corresponds to the first to third embodiments (described later) of the optical system according to the present invention.

In this arrangement, the wavelength band limiting device is detachable. Accordingly, the wavelength band limiting device can be readily detached or replaced with another wavelength band limiting device.

The effect of unwanted-order light on the image depends upon the sensitivity of a light-receiving element used. Let us consider a case where an image is observed directly with a human eye, for example. The luminous efficiency of the human eye has a peak in the vicinity of the wavelength of 550 nanometers; it is very low in the vicinities of 400 nanometers and 700 nanometers. Therefore, if wavelength bands in which the diffraction efficiency for unwanted-order light increases are in the regions of 400 nanometers and 700 nanometers, respectively, the effect of unwanted-order light is little because the sensitivity of the eye is low in these wavelength regions from the beginning. It may be unnecessary to remove unwanted-order light completely by the wavelength band limiting device. In a case where light is received with a solid-state image pickup device, the sensitivity distribution differs from that of the human eye. Furthermore, there are cases where the sensitivity is high even in the short and long wavelength regions. In such a case, the wavelength band limiting device must further reduce the intensity of unwanted-order light.

Thus, the performance required for the wavelength band limiting device varies according to the type of light-receiving element used. For this reason, it is desirable for the wavelength band limiting device to be changeable according to circumstances. Therefore, if the wavelength band limiting device is detachable, it can be readily replaced with other wavelength band limiting devices that have performance conformable to various circumstances, e.g. direct observation with a human eye, observation through a monitor by receiving light with a solid-state image pickup device, and photography using a photographic film.

In this arrangement, because the wavelength band limiting device is detachable, it can be readily replaced with another wavelength band limiting device having optimum performance for each viewing circumstance. Under each circumstance, an even more favorable image can be obtained. Furthermore, it is possible to obtain an optical system of excellent general-purpose properties that can be used in various circumstances.

In the above-described optical system according to the present invention, it is desirable to satisfy at least one of the following conditions (1) to (4):

$$0 < A_0/A_a < 0.1 \tag{1}$$

$$\lambda_S/\lambda_0 < 0.95 \tag{2}$$

$$\lambda_L/\lambda_0 > 1.2 \tag{3}$$

$$|C_1 - C_2| < 20\% \text{ (in a working wavelength band } \lambda_1 < \lambda < \lambda_2) \tag{4}$$

where:
Ahd a: the total light quantity in the object wavelength band;
$A_0$: the quantity of orders of diffracted light unnecessary for image formation in the object wavelength band;
$\lambda_0$: an optimization wavelength;
$\lambda_S$: a wavelength shorter than $\lambda_0$ at which the light quantity is cut by 50%;
$\lambda_L$: a wavelength longer than $\lambda_0$ at which the light quantity is cut by 50%;
$C_1$: the diffraction efficiency (%) for a working order of diffracted light at the shortest wavelength $\lambda_1$ in the working wavelength band when the working order of diffracted light is optimized at the wavelength $\lambda_0$;
$C_2$: the diffraction efficiency (%) for the working order of diffracted light at the longest wavelength $\lambda_2$ in the working wavelength band when the working order of diffracted light is optimized at the wavelength $\lambda_0$.

The optical system arranged to satisfy at least one of the above conditions (1) to (4) corresponds to the first to third embodiments (described later) of the optical system according to the present invention.

In this arrangement, at least one of the above conditions (1) to (4) is satisfied.

When the condition (1) is satisfied, the following advantageous effects are obtained. That is, in an object wavelength band in which the quantity of orders of diffracted light unnecessary for image formation would reach a level at which the effect of unwanted-order light cannot be disregarded if there is no wavelength band limiting device, the quantity of unwanted-order light is smaller then 10% of the total light quantity in the object wavelength band. Accordingly, the effect of unwanted-order light on the image is weak, and it is possible to prevent degradation of the image quality effectively.

The smaller the quantity of unwanted-order light, the better. However, the quantity of unwanted-order light does not always need to be zero, provided that the effect of unwanted-order light on the image is so weak that it can be disregarded. It is very difficult to completely remove unwanted-order light while maintaining the quantity of a working order of diffracted light, which is necessary for image formation. In the optical system according to the present invention, the quantity of unwanted-order light is not zero. Therefore, satisfying the condition (1) makes it possible to provide an optical system of high implementability while effectively preventing degradation of the image quality.

Let us consider an optical system that includes a relief type diffractive optical element having a protective layer of PC formed on a substrate of BSL7 and that is adapted to remove unwanted-order light by a wavelength band limiting device having the transmittance distribution shown in FIG. 9, by way of example. Assuming that the intensity of light incident on the relief type diffractive optical element is constant independently of wavelengths, the relative intensities of zero-order light and second-order light, which are orders of diffracted light unnecessary for image formation, are such as those shown in FIG. 10. It should be noted that in this case, the optimization wavelength $\lambda_0$ is assumed to be 510 nanometers, and the intensity of light before it is incident on the relief type diffractive optical element is assumed to be 1.

In this case, the ratio of the quantity of unwanted-order light (zero-order light and second-order light) to the total light quantity (the sum total of the quantities of zero-order light, first-order light and second-order light) in the wavelength range of from 400 nanometers to 700 nanometers is about 0.09.

When the condition (2) is satisfied, the wavelength $\lambda_S$ at which the wavelength band limiting device cuts the light quantity by 50% in a wavelength region shorter than the optimization wavelength $\lambda_0$ is given by $$\lambda_S < 0.95 \lambda_0 \tag{12}$$

For example, when the optimization wavelength $\lambda_0$ is 510 nanometers, $\lambda_S < 484.5$ nanometers.

When the condition (3) is satisfied, the wavelength $\lambda_L$ at which the wavelength band limiting device cuts the light quantity by 50% in a wavelength region longer than the optimization wavelength $\lambda_0$ is given by $$\lambda_L > 1.2 \lambda_0 \tag{13}$$

For example, when the optimization wavelength $\lambda_0$ is 510 nanometers, $\lambda_L > 612$ nanometers.

If $\lambda_S/\lambda_0$ is not smaller than the upper limit of the condition (2) or if $\lambda_L/\lambda_0$ is not larger than the lower limit of the condition (3), the wavelength bands to be limited are excessively close to the optimization wavelength $\lambda_0$. Consequently, the wavelength band width for forming a color image becomes unfavorably narrow, and it becomes impossible to maintain color reproduction satisfactorily. Conversely, if the condition (2) or (3) is satisfied, satisfactory color reproduction can be maintained.

Incidentally, the diffraction efficiency of the relief type diffractive optical element lowers in both short and long wavelength sides with respect to the optimization wavelength $\lambda_0$ as has been stated above. If the optimization wavelength $\lambda_0$ is excessively close to the short wavelength side in the wavelength band used for image formation, the diffraction efficiency for the order of diffracted light necessary for image formation in the long wavelength region reduces. As a result, the color in the long wavelength region becomes weak. In addition, the quantity of unwanted-order light increases, resulting in an increase in the effect of unwanted-order light on the image. Consequently, the image quality degrades remarkably. On the other hand, if the optimization wavelength $\lambda_0$ is excessively close to the long wavelength side in the wavelength band used for image formation, the diffraction efficiency for the order of diffracted light necessary for image formation in the short wavelength region reduces. As a result, the color in the short wavelength region becomes weak. In addition, the quantity of unwanted-order light increases, resulting in an increase in the effect of unwanted-order light on the image. Consequently, the image quality degrades remarkably as in the case of the above. Accordingly, it is necessary to determine the optimization wavelength $\lambda_0$ so that the diffraction efficiencies for the order of diffracted light used for image formation at both extremities of the working wavelength band are approximately equal to each other.

When the condition (4) is satisfied, the difference between the diffraction efficiencies $C_1$ and $C_2$ is smaller than 20%. Consequently, in the working wavelength band, the diffraction efficiency for the order of diffracted light necessary for image formation becomes high, and the diffraction efficiency for unwanted-order light becomes low.

Assuming that first-order diffracted light is used for image formation, the m-th diffraction efficiency $C_{(m)}$ at an arbitrary wavelength $\lambda$ can be calculated from the following equation (14) with respect to the optimization wavelength $\lambda_0$:

$$C_{(m)} = \left| \sin\pi \left[ m - \{n_1(\lambda) - n_2(\lambda)\}(\lambda_0/\lambda) / \{n_1(\lambda_0) - n_2(\lambda_0)\} \right] \div \left[ \pi m - \pi\{n_1(\lambda) - n_2(\lambda)\}(\lambda_0/\lambda) / \{n_1(\lambda_0) - n_2(\lambda_0)\} \right] \right|^2 \tag{14}$$

Accordingly, if a relief type diffractive optical element having a protective layer of PC provided on a substrate of BSL7, for example, is used in the wavelength band of 400 nanometers<$\lambda$<700 nanometers, using first-order diffracted light, the optimization wavelength $\lambda_0$ should be set within the wavelength range of from about 464 nanometers to about 496 nanometers in order to satisfy the condition (4). FIG. 11 is a diagram showing the diffraction efficiency for first-order diffracted light when the optimization wavelength $\lambda_0$ is set at 464 nanometers and at 496 nanometers. In the figure, curve ① represents the diffraction efficiency when the optimization wavelength $\lambda_0$ is 464 nanometers, and curve ② represents the diffraction efficiency when the optimization wavelength $\lambda_0$ is 496 nanometers. As will be understood from FIG. 11, when the optimization wavelength $\lambda_0$ is in the range of from 464 nanometers to 496 nanometers, the diffraction efficiency for first-order diffracted light is high in the wavelength band of 400 nanometers<λ<700 nanometers, which is necessary for image formation, and the difference between the diffraction efficiencies in the short and long wavelength regions is small.

In the above-described arrangement, when the condition (1) is satisfied, the quantity of unwanted-order light becomes smaller than 10% of the total light quantity. Accordingly, it becomes possible to effectively reduce the degradation of the image quality due to unwanted-order light, and an image of high quality can be obtained.

When the condition (2) or (3) is satisfied, color reproduction can be maintained satisfactorily without excessively narrowing the wavelength band used for image formation. Accordingly, an image of high quality can be obtained.

When the condition (4) is satisfied, the optical system becomes free from such a problem that the effect of unwanted-order light increases only in the short or long wavelength region, or the order of diffracted light used for image formation weakens. Accordingly, it is possible to obtain a color-balanced image of high quality.

Therefore, an image of high quality can be obtained by satisfying at least one of the conditions (1) to (4).

In the above-described optical system according to the present invention, it is desirable to satisfy at least one of the following conditions (5) to (8):

$$0 < A_0/A_a < 0.05 \tag{5}$$

$$\lambda_S/\lambda_0 < 0.94 \tag{6}$$

$$\lambda_L/\lambda_0 > 1.22 \tag{7}$$

$$|C_1 - C_2| < 10\% \text{ (in a working wavelength band } \lambda_1 < \lambda < \lambda_2) \tag{8}$$

where:

$A_a$: the total light quantity in the object wavelength band;

$A_0$: the quantity of orders of diffracted light unnecessary for image formation in the object wavelength band;

$\lambda_0$ : an optimization wavelength;

$\lambda_S$: a wavelength shorter than $\lambda_0$ at which the light quantity is cut by 50%;

$\lambda_L$: a wavelength longer than $\lambda_0$ at which the light quantity is cut by 50%;

$C_1$: the diffraction efficiency (%) for a working order of diffracted light at the shortest wavelength $\lambda_1$ in the working wavelength band when the working order of diffracted light is optimized at the wavelength $\lambda_0$;

$C_2$: the diffraction efficiency (%) for the working order of diffracted light at the longest wavelength $\lambda_2$ in the working wavelength band when the working order of diffracted light is optimized at the wavelength $\lambda_0$.

The optical system arranged to satisfy at least one of the above conditions (5) to (8) corresponds to the first to third embodiments (described later) of the optical system according to the present invention.

In this arrangement, at least one of the above conditions (5) to (8) is satisfied.

When the condition (5) is satisfied, the quantity of unwanted-order light becomes smaller than 5% of the total light quantity. Thus, the effect of unwanted-order light becomes even weaker than in the case of satisfying the condition (1).

When the condition (6) or (7) is satisfied, the wavelengths $\lambda_S$ and $\lambda_L$ at which the light quantity is cut by 50% are given by $$\lambda_S < 0.94 \lambda_0 \tag{15}$$

$$\lambda L > 1.22 \lambda_0 \tag{16}$$

When the optimization wavelength $\lambda_0$ is 510 nanometers, for example, $\lambda_S < 479.4$ nanometers, and $\lambda_L > 622.2$ nanometers. In comparison to the conditions (2) and (3), the upper limit for $\lambda_S$ and the lower limit for $\lambda_L$ are away from the optimization wavelength. Therefore, the wavelength band width for forming a color image enlarges, and color reproduction can be maintained even more satisfactorily.

When the condition (8) is satisfied, the difference between the diffraction efficiencies $C_1$ and $C_2$ for the order of diffracted light used for image formation at both extremities of the working wavelength band is smaller than 10%, which is smaller than in the case of the condition (4). Therefore, the color balance becomes even better, and the effect of unwanted-order light also becomes even weaker.

In the optical system arranged as stated above, when the condition (5) is satisfied, the quantity of unwanted-order light becomes smaller than 5% of the total light quantity, and it becomes possible to reduce the degradation of the image quality due to unwanted-order light even more effectively. Thus, an image of higher quality can be obtained.

When the condition (6) or (7) is satisfied, the wavelength band used for image formation is not excessively narrowed, and color reproduction can be maintained even more satisfactorily. Accordingly, an image of higher quality can be obtained.

When the condition (8) is satisfied, the optical system becomes free from such a problem that the effect of unwanted-order light increases only in the short or long wavelength region, or the order of diffracted light used for image formation weakens. Accordingly, it is possible to obtain an image of high quality that is color-balanced even more favorably.

Therefore, an image of higher quality can be obtained by satisfying at least one of the conditions (5) to (8).

In the above-described optical system according to the present invention, it is desirable to satisfy the following condition (9):

$$|C_1 - C_2| < 5\% \text{ (in a working wavelength band } \lambda_1 < \lambda < \lambda_2) \tag{9}$$

where:

$C_1$: the diffraction efficiency (%) for a working order of diffracted light at the shortest wavelength $\lambda_1$ in the working wavelength band when the working order of diffracted light is optimized at the wavelength $\lambda_0$;

$C_2$: the diffraction efficiency (%) for the working order of diffracted light at the longest wavelength $\lambda_2$ in the working wavelength band when the working order of diffracted light is optimized at the wavelength $\lambda_0$.

The optical system arranged to satisfy the condition (9) corresponds to the first to third embodiments (described later) of the optical system according to the present invention.

In the optical system arranged as stated above, when the condition (9) is satisfied, the difference between the diffraction efficiencies $C_1$ and $C_2$ for the order of diffracted light used for image formation at both extremities of the working wavelength band is smaller than 5%, which is smaller than in the case of the condition (8). Therefore, the intensities of the order of diffracted light used for image formation in the short and long wavelength regions becomes equal to each other even more accurately. Accordingly, the color balance can be maintained even more favorably. In addition, the effect of unwanted-order light further weakens, and an image of higher quality can be obtained.

When any of the conditions (1) to (4), (5) to (8) and (9) is satisfied, the optical system may be arranged such that the wavelength $\lambda_1$ is 400 nanometers, and the wavelength $\lambda_2$ is 700 nanometers.

The arrangement stated above corresponds to the first to third embodiments (described later) of the optical system according to the present invention.

In this arrangement, the wavelength $\lambda_1$ is 400 nanometers, and the wavelength $\lambda_2$ is 700 nanometers. In other words, the wavelength band used for image formation is from 400 nanometers to 700 nanometers. This wavelength band is a visible wavelength region. Because image formation is effected by using light in this wavelength band, an image of visible light can be obtained.

In this arrangement, visual observation can be performed because an image of visible light can be obtained. In addition, the optical system according to the present invention, which can obtain an image of visible light, can be used in various apparatuses wherein an image is observed or photographically recorded by using visible light, e.g. cameras, microscopes, and endoscopes. Thus, an optical system having a wide applicable range can be obtained.

In the above-described optical system according to the present invention, the optical member having a relief configuration on a surface thereof and the protective layer, which constitute the relief type diffractive optical element, may be arranged such that one of them is made of a material of high refractive index and high dispersion in comparison to a material constituting the other.

The arrangement stated above corresponds to the first to third embodiments (described later) of the optical system according to the present invention.

In this arrangement, the optical member having a relief configuration on a surface thereof and the protective layer, which constitute the relief type diffractive optical element, are arranged such that one of them is made of a material of high refractive index and high dispersion, and the other is made of a material of low refractive index and low dispersion. As will be understood from Eq. (11), if the refractive index difference $n_1-n_2$ between the optical member having a relief configuration on a surface thereof and the protective layer is small, the groove depth d' in the diffraction surface must be made great. This makes it difficult to produce the diffractive optical element. Therefore, in order to reduce the groove depth d' to a certain extent, it is necessary to arrange the optical member having a relief configuration on a surface thereof and the protective layer such that one of them is made of a material of high refractive index, and the other is made of a material of low refractive index.

In general, commercially available glass materials have the tendency that those which have high refractive index exhibit high dispersion, and those which have low refractive index exhibit low dispersion. Therefore, in a case where a glass material is used to form the optical member of the relief type diffractive optical element that has a relief configuration on a surface thereof, if the optical member is made of a material of high refractive index and high dispersion or a material of low refractive index and low dispersion, it is possible to select a material fit for a particular purpose from among many usable materials.

If a resin material is used as a material for the optical member having a relief configuration on a surface thereof or the protective layer, the production becomes easy, and the cost reduces. Examples of optical plastic raw materials usable in the present invention are PMMA (polymethyl methacrylate), SAN (styrene acrylonitrile), PS (polystyrene) and diethylene glycol bis-aryl carbonate in addition to PC. These materials also have the tendency that the lower the refractive index, the lower the dispersion, and the higher the refractive index, the higher the dispersion. Therefore, it is preferable to form the protective layer from a material of high refractive index and high dispersion or a material of low refractive index and low dispersion. By doing so, a resin material can be used, and the production of the protective layer is facilitated.

In this arrangement, the optical member having a relief configuration on a surface thereof and the protective layer, which constitute the relief type diffractive optical element, are arranged such that one of them is made of a material of high refractive index and high dispersion, and the other is made of a material of low refractive index and low dispersion. Therefore, the difference in refractive index between the optical member and the protective layer is large. Accordingly, the groove depth in the diffraction surface can be reduced, and thus the production becomes easy. Moreover, it is possible to select a material fit for a particular purpose from a variety of glass materials of high refractive index and high dispersion or low refractive index and low dispersion. Furthermore, optical plastic materials also have the tendency that the lower the refractive index, the lower the dispersion, and the higher the refractive index, the higher the dispersion. Therefore, if the substrate and the protective layer are arranged such that one of them is made of a material of high refractive index and high dispersion, and the other is made of a material of low refractive index and low dispersion, it is possible to use a plastic material that is less costly and has excellent workability. Thus, the production becomes easy, and a relief type diffractive optical element provided with a protective layer can be obtained at reduced cost.

In the above-described optical system according to the present invention, the optical member having a relief configuration on a surface thereof and the protective layer, which constitute the relief type diffractive optical element, may be arranged such that one of them is made of a material of high refractive index and low dispersion in comparison to a material constituting the other.

The arrangement stated above corresponds to the first to third embodiments (described later) of the optical system according to the present invention.

In this arrangement, the optical member having a relief configuration on a surface thereof and the protective layer, which constitute the relief type diffractive optical element, are arranged such that one of them is made of a material of high refractive index and low dispersion, and the other is made of a material of low refractive index and high dispersion. As has been stated above in regard to the case where one of the optical member and the protective layer is made of a material of high refractive index and high dispersion, and the other is made of a material of low refractive index and low dispersion, if one of them has a high refractive index, and the other has a low refractive index, the difference in refractive index becomes large, and the groove depth in the diffraction surface can be reduced.

If the optical member having a relief configuration on a surface thereof and the protective layer are arranged such that one of them is made of a material of high refractive index and low dispersion, and the other is made of a material of low refractive index and high dispersion, the wavelength dependence of the diffraction efficiency of the relief type diffractive optical element reduces in comparison to a case where no protective layer is provided. FIG. 12 is a diagram showing the wavelength dependence of the diffraction efficiency for first-order light in each of two cases, i.e. one where the optical member having a relief configuration on a surface thereof is formed from LAL 56 (manufactured by OHARA K. K.; $n_d$=1.67790, and $V_d$=50.7) and the protective layer is formed from PC, and the other where the optical member having a relief configuration on a surface thereof is formed from LAL56, and no protective layer is provided. In these cases, the optimization wavelength is 510 nanometers. In the figure, curve ① represents the wavelength dependence in the case where the protective layer is provided, and curve ② represents the wavelength dependence in the case where no protective layer is provided.

As will be understood from FIG. 12, the provision of the protective layer of PC reduces the wavelength dependence of the diffraction efficiency and hence minimizes the reduction in the diffraction efficiency in short and long wavelength regions with respect to the optimization wavelength. In the short wavelength region in particular, the diffraction efficiency is approximately 100%. In this case, the diffraction efficiencies for zero-order light and second-order light, which are unwanted-order light, are such as those shown in FIG. 13. FIG. 14 shows the diffraction efficiencies for zero-order light and second-order light in a case where the protective layer of PC is not provided. It will be understood from these figures that the diffraction efficiency for unwanted-order light is reduced by providing the protective layer. In the short wavelength region in particular, the diffraction efficiency for unwanted-order light is almost 0%. In the short wavelength region, the effect of unwanted-order light can be sufficiently reduced even with a wavelength band limiting device having a relatively small attenuation index; there are cases where the effect of unwanted-order light can be disregarded.

In the long wavelength region, the diffraction efficiency for first-order light increases, whereas the diffraction efficiency for unwanted-order light decreases. Therefore, the effect of unwanted-order light reduces. Accordingly, a wavelength at which the effect of unwanted-order light becomes so large that it cannot be disregarded shifts toward the long wavelength side. Consequently, the wavelength band that has to be limited by the wavelength band limiting device also shifts toward the long wavelength side. Thus, the wavelength band usable for image formation widens, and it becomes possible to obtain an image of even more favorable color reproduction.

In this arrangement, the optical member having a relief configuration on a surface thereof and the protective layer, which constitute the relief type diffractive optical element, are arranged such that one of them is made of a material of high refractive index and low dispersion, and the other is made of a material of low refractive index and high dispersion. Therefore, the wavelength dependence of the diffraction efficiency of the relief type diffractive optical element itself reduces, and the intensity of unwanted-order light also weakens. Accordingly, it is possible to further minimize the effect of unwanted-order light and to obtain an image of high quality. In addition, the effect of unwanted-order light is small from the beginning. Therefore, in a short wavelength region with respect to the optimization wavelength, the wavelength band that should be limited by the wavelength band limiting device shifts toward the short wavelength side; in a long wavelength region with respect to the optimization wavelength, the wavelength band to be limited shifts toward the long wavelength side. Accordingly, the wavelength band usable for image formation widens, and it is possible to obtain an image of even more favorable color reproduction.

An image pickup apparatus according to the present invention, which is provided to attain the above-described object, is arranged to form an image of an object on an electronic image pickup device by the above-described optical system according to the present invention.

The arrangement stated above corresponds to a first embodiment (described later) of the image pickup apparatus according to the present invention.

In the above-described arrangement according to the present invention, incident light from the object passes through the optical system according to the present invention to form an image on a photoelectric conversion surface of the electronic image pickup device. The image is converted into electric signals, and these signals are detected. As has been stated above, the optical system includes a relief type diffractive optical element having a protective layer on a diffraction surface, and a wavelength band limiting device. The optical system is arranged to remove orders of diffracted light unnecessary for image formation, which are produced by the relief type diffractive optical element, and to reduce the effect of unwanted-order light on the image despite the presence of the protective layer on the diffraction surface, thereby forming an image of high quality. Accordingly, the image of the object formed on the electronic image pickup device is of high quality, in which the effect of unwanted-order light has been minimized.

In the above-described arrangement according to the present invention, an object image is formed on the electronic image pickup device by the optical system capable of obtaining an image of high quality even if a protective layer is provided on the diffraction surface by reducing the effect of unwanted-order light produced by the relief type diffractive optical element. Accordingly, it is possible to minimize the effect of unwanted-order light and to obtain an image of high quality.

The above-described image pickup apparatus according to the present invention may be arranged such that the electronic image pickup device is combined with a signal processing device that processes the output signals from the electronic image pickup device to correct color information concerning the object.

The arrangement stated above corresponds to the first embodiment (described later) of the image pickup apparatus according to the present invention.

In this arrangement, the electronic image pickup device is combined with a signal processing device that processes the output signals from the electronic image pickup device to correct color information concerning the object. The image pickup apparatus according to the present invention has an image-forming optical system including a wavelength band limiting device to remove light in wavelength regions where the effect of orders of diffracted light unnecessary for image formation increases to such an extent that it cannot be disregarded. Thus, the wavelength band limiting device reduces the effect of unwanted-order light. At this time, the wavelength band limiting device also removes the order of diffracted light used for image formation to some extent in the wavelength regions. Accordingly, the color reproduction of the image degrades unfavorably.

In this arrangement, the signal processing device combined with the electronic image pickup device corrects color information concerning the object. Therefore, even if the order of diffracted light used for image formation is removed by the wavelength band limiting device in those wavelength regions, color information concerning the object can be corrected so as to prevent degradation of the color reproduction of the image.

Thus, in this arrangement, color information concerning the object is corrected by the signal processing device combined with the electronic image pickup device. Therefore, it is possible to prevent degradation of the color reproduction due to the wavelength band limiting device for reducing the effect of unwanted-order light, and thus image information of excellent color reproduction can be obtained.

To attain the above-described object, the present invention provides another image pickup apparatus in which an image of an object is formed on an electronic image pickup device by the optical system according to the present invention, in which the wavelength band limiting device includes at least a part of optical elements constituting the optical system other than the relief type diffractive optical element, or in which the wavelength band limiting device includes the relief type diffractive optical element and at least a part of optical elements constituting the optical system other than the relief type diffractive optical element. In the image pickup apparatus, at least one of the optical elements included in the wavelength band limiting device is a cover glass that protects a photoelectric conversion surface of the electronic image pickup device.

The arrangement stated above corresponds to the first embodiment (described later) of the image pickup apparatus according to the present invention.

In this arrangement, at least one part of the optical elements included in the wavelength band limiting device is a cover glass that protects the photoelectric conversion surface of the electronic image pickup device. Accordingly, when at least a part of unwanted-order light produced by the relief type diffractive optical element is incident on the cover glass of the electronic image pickup device, the incident light is removed by the cover glass. Thus, only an order of diffracted light necessary for image formation is incident on the photoelectric conversion surface of the electronic image pickup device. The cover glass is generally an element that is provided on the electronic image pickup device from the beginning. Therefore, there is no need to add an element for limiting a wavelength band.

In this arrangement, at least a part of the function of the wavelength band limiting device is imparted to a cover glass for protecting the photoelectric conversion surface, which is provided on the electronic image pickup device from the beginning. Therefore, it is unnecessary to add an element for limiting a wavelength band. Accordingly, the number of constituent elements can be reduced, and the image pickup apparatus can be made compact.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

DESCRIPTION OF THE PREFERRED EMBODIMENTS

Embodiments of the optical system according to the present invention and the image pickup apparatus according to the present invention, which includes the optical system, will be described below.

(First Embodiment of Optical System)

Figure 15:
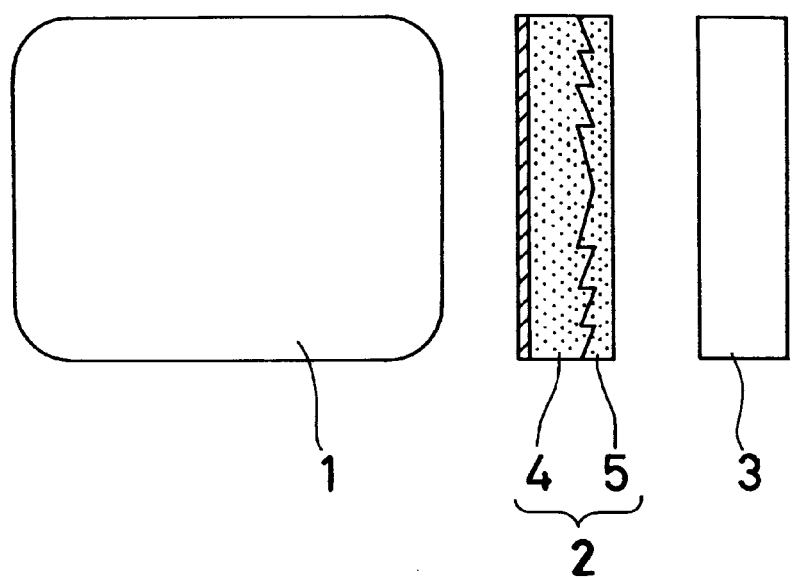
FIG. 15 is a diagram schematically showing a first embodiment of the optical system according to the present invention.

FIG. 15 is a diagram schematically showing a first embodiment of the optical system according to the present invention. The optical system is adapted to form an image of an object. The optical system has a lens unit 1, a relief type diffractive optical element 2, and a wavelength band limiting device 3. Band light from the object enters the lens unit 1 from the left side as viewed in the figure. After being refracted and transmitted by the lens unit 1, the light from the object enters the relief type diffractive optical element 2. The light is diffracted by the relief type diffractive optical element 2. A working order of diffracted light, which is necessary for image formation, passes through the wavelength band limiting device 3 and forms an image. On the other hand, unwanted orders of diffracted light, which are unnecessary for image formation, are removed by the wavelength band limiting device 3.

The relief type diffractive optical element 2 includes an optical member 4 having a relief configuration on a surface thereof. The relief configuration comprises projections and recesses. The relief type diffractive optical element 2 further includes a protective layer 5 formed on the diffraction surface of the optical member 4. Because the diffraction surface is covered with the protective layer 5, there is no possibility of dust or other foreign matter collecting in the grooves of the diffraction surface. If the surface of the protective layer 5 is stained, it is easy to remove the stains because the surface is flat. Furthermore, the diffraction surface is prevented from being flawed. Thus, it is possible to prevent the relief pattern configuration from being deformed.

As shown in FIG. 1, there are various relief configurations available for the relief type diffractive optical element 2. It is particularly preferable to use a relief configuration having a sawtooth sectional configuration such as that shown in part (a) of FIG. 1. In the case of such a sawtooth relief configuration, the diffraction efficiency for a certain order of diffracted light at a certain wavelength can be made 100%. Accordingly, light incident on the relief type diffractive optical element 2 can be used effectively.

Figure 16A:
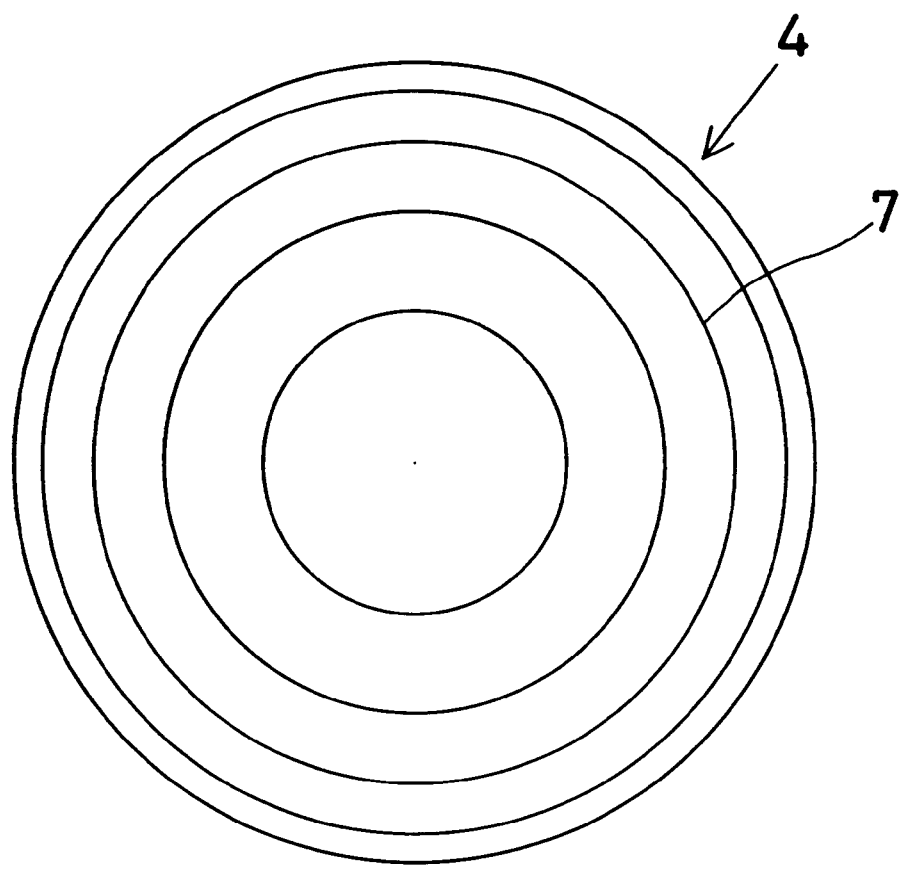
FIGS. 16(a) and 16(b) show in plan and sectional views one example of a relief type diffractive optical element used in the present invention.
Figure 16B:
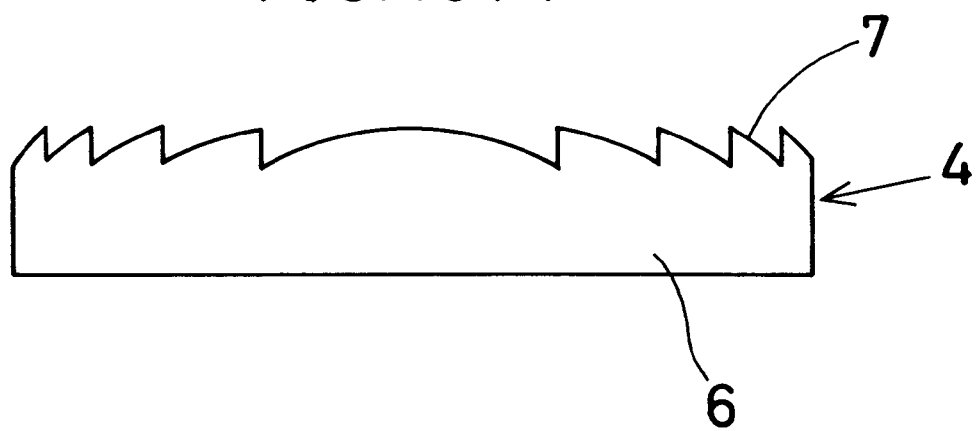

In this embodiment, the optical member 4 having a relief configuration on a surface thereof, which constitutes the relief type diffractive optical element 2, is arranged as shown in parts (a) and (b) of FIG. 16, which are a plan and sectional views. That is, a relief pattern 7 having a sawtooth sectional configuration is formed in the shape of a concentric circle pattern on a planeparallel plate-shaped substrate 6 of an optical material. The relief pattern 7 is formed so as to use first-order light and such that the image-forming performance is optimized in correlation to other lens elements.

Figure 1A:
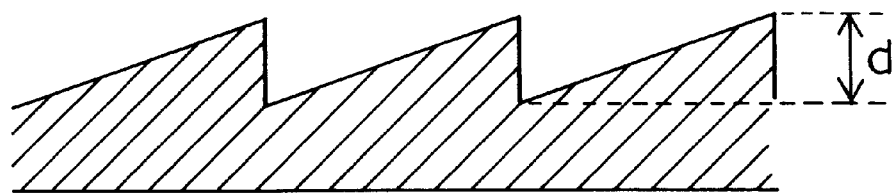
FIGS. 1(a)–1(d) are sectional views showing relief patterns of relief type diffractive optical elements.
Figure 1B:
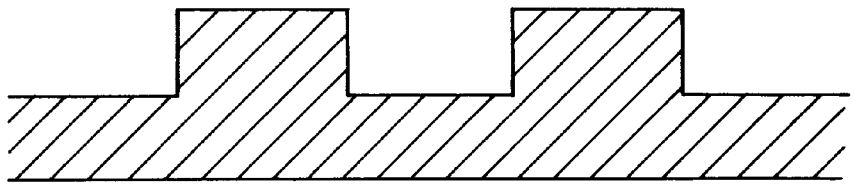
Figure 1C:
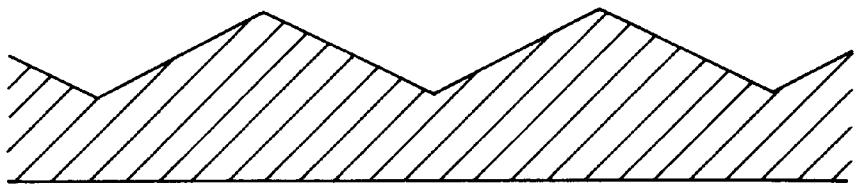
Figure 1D:
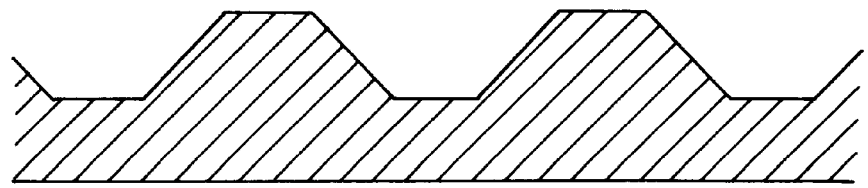
Figure 2:
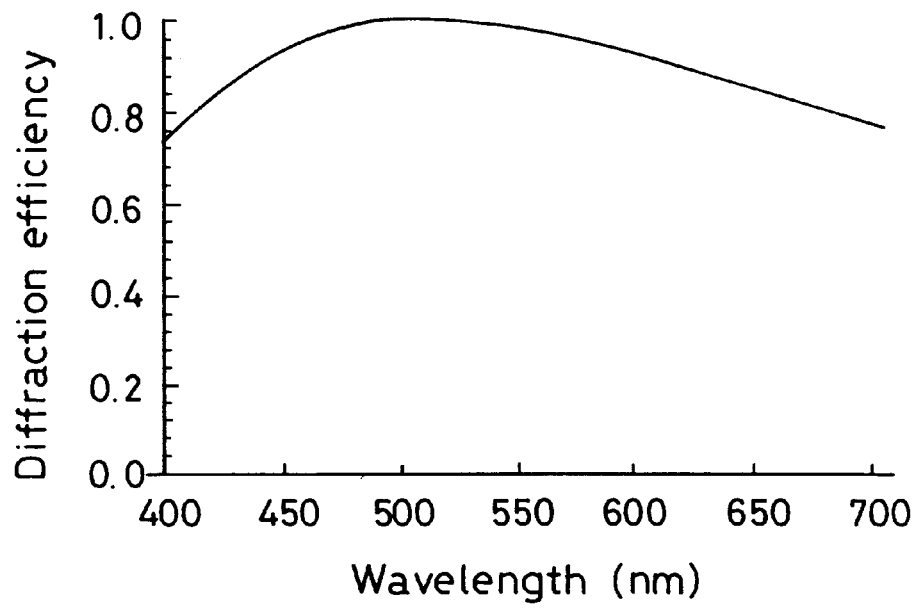
FIG. 2 is a diagram showing an example of the diffraction efficiency for first-order light of a relief type diffractive optical element.
Figure 3:
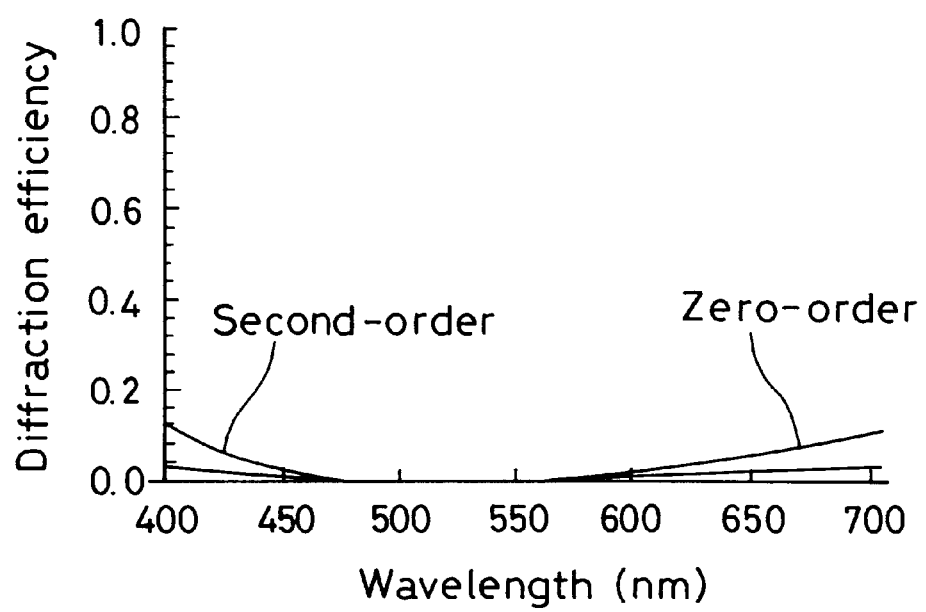
FIG. 3 is a diagram showing the diffraction efficiencies for zero-order light and second-order light in the case of FIG. 2.
Figure 4:
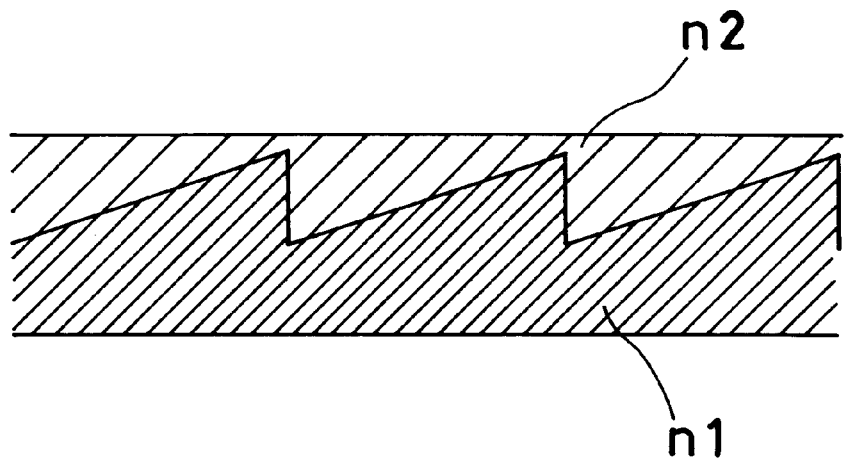
FIG. 4 is a sectional view showing an example of a relief type diffractive optical element provided with a protective layer.
Figure 5:
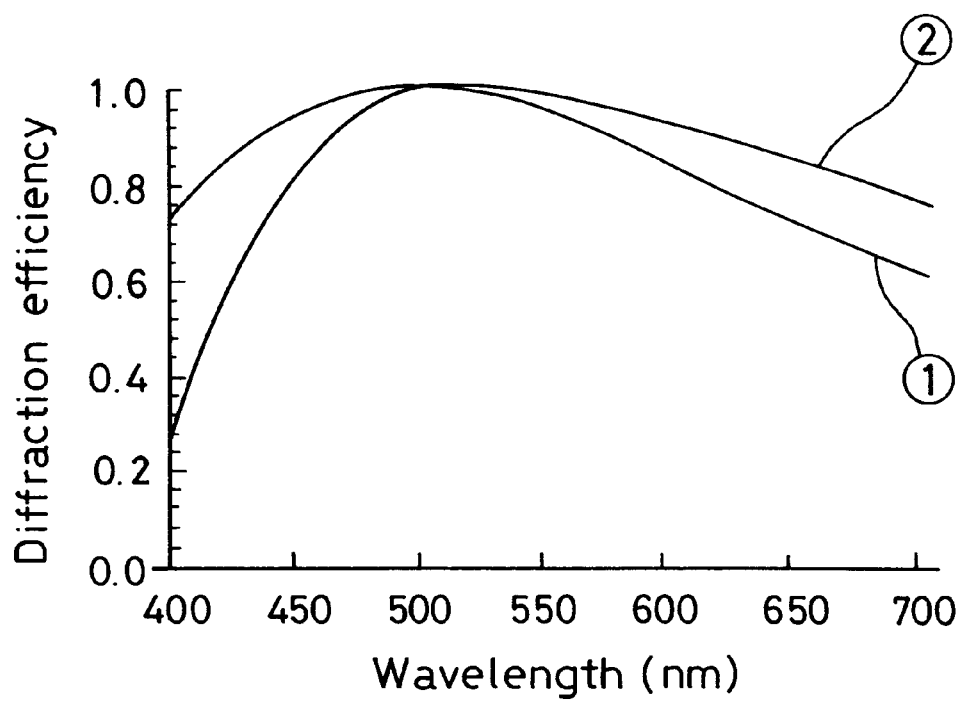
FIG. 5 is a diagram showing the diffraction efficiency for first-order light in each of two cases where the relief type diffractive optical element having the diffraction efficiency shown in FIG. 2 is provided with a protective layer and where it is provided with no protective layer, respectively.
Figure 6:
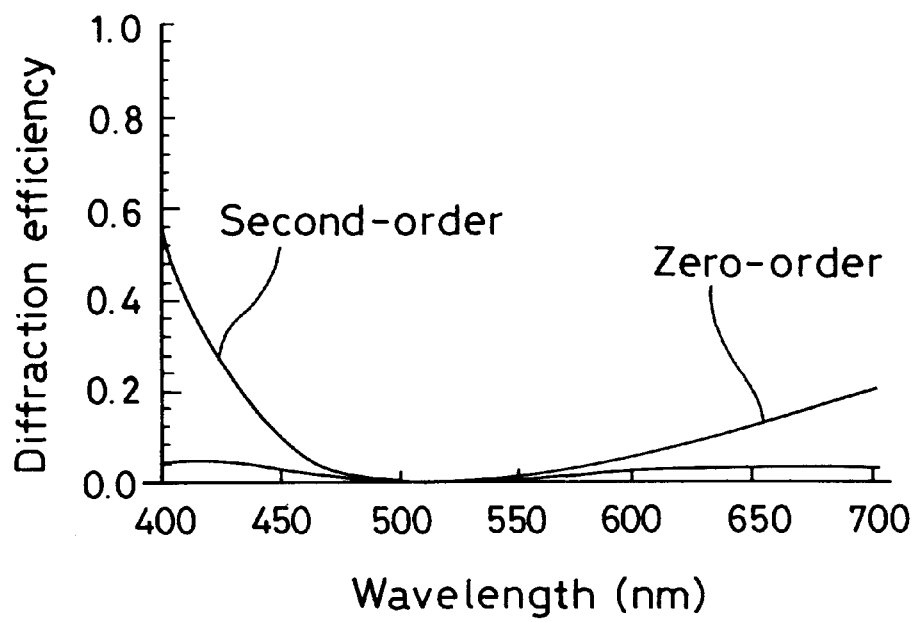
FIG. 6 is a diagram showing the diffraction efficiencies for zero-order light and second-order light in a case where the relief type diffractive optical element having the diffraction efficiency shown in FIG. 2 is provided with a protective layer.

Various materials are available for the optical member 4, which has a relief configuration on a surface thereof, and the protective layer 5. In this embodiment, the optical member 4 is formed from BSL7, and the protective layer 5 is made of PC. In this case, the diffraction efficiency for first-order light of the relief type diffractive optical element 2 is such as that represented by curve ① in FIG. 5. The diffraction efficiencies for zero-order light and second-order light of the relief type diffractive optical element 2 are such as those shown in FIG. 6. It should be noted that in this case, the optimization wavelength is assumed to be 510 nanometers. When the protective layer 5 is not provided, the diffraction efficiency for first-order light is such as that represented by curve ② in FIG. 5, and the diffraction efficiencies for zero-order light and second-order light are such as those shown in FIG. 3. It will be understood that when the protective layer 5 is provided, the diffraction efficiency for first-order light lowers, while the diffraction efficiency for unwanted-order light increases on the short and long wavelength sides of the optimization wavelength. This tendency is particularly strong in the short wavelength region. Unwanted-order light causes flare or ghost, which leads to degradation of the image quality.

In this embodiment, first-order light and unwanted-order light, which are produced by the relief type diffractive optical element 2, are incident on the wavelength band limiting device 3. In a case where the wavelength band limiting device 3 has a transmittance distribution such as that shown in FIG. 7, when white light is incident on the wavelength band limiting device 3, light of wavelength shorter than about 440 nanometers and light of wavelength longer than about 620 nanometers cannot pass through the wavelength band limiting device 3 and are removed. Light in the wavelength range of from about 440 nanometers to about 620 nanometers passes through the wavelength band limiting device 3 efficiently.

Figure 8:
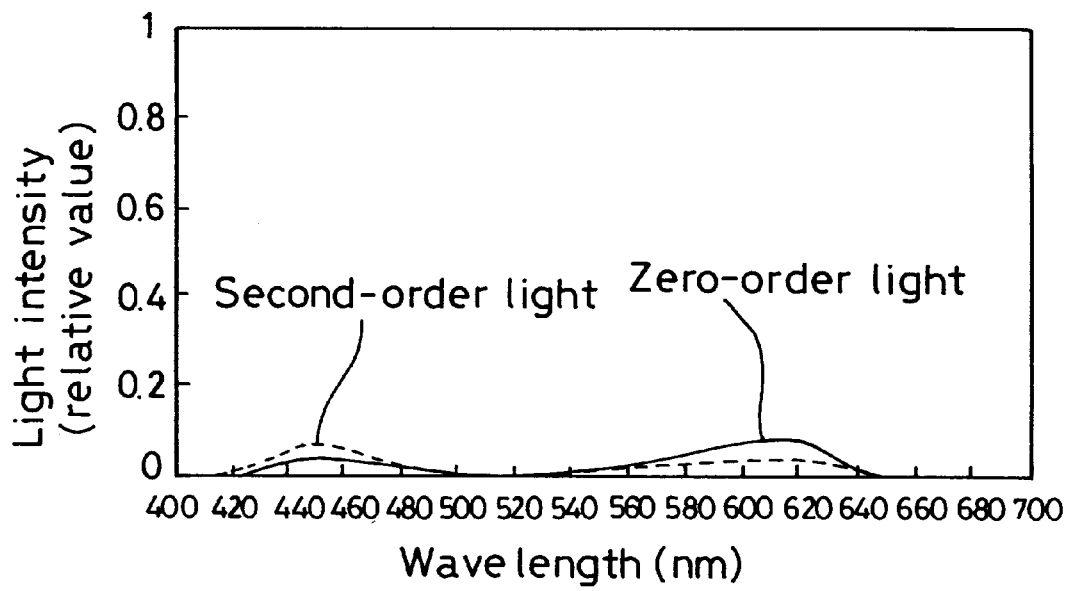
FIG. 8 is a diagram showing the relative intensity distribution of unwanted-order light in the case of using the wavelength band limiting device having the transmittance distribution shown in FIG. 7.
Figure 9:
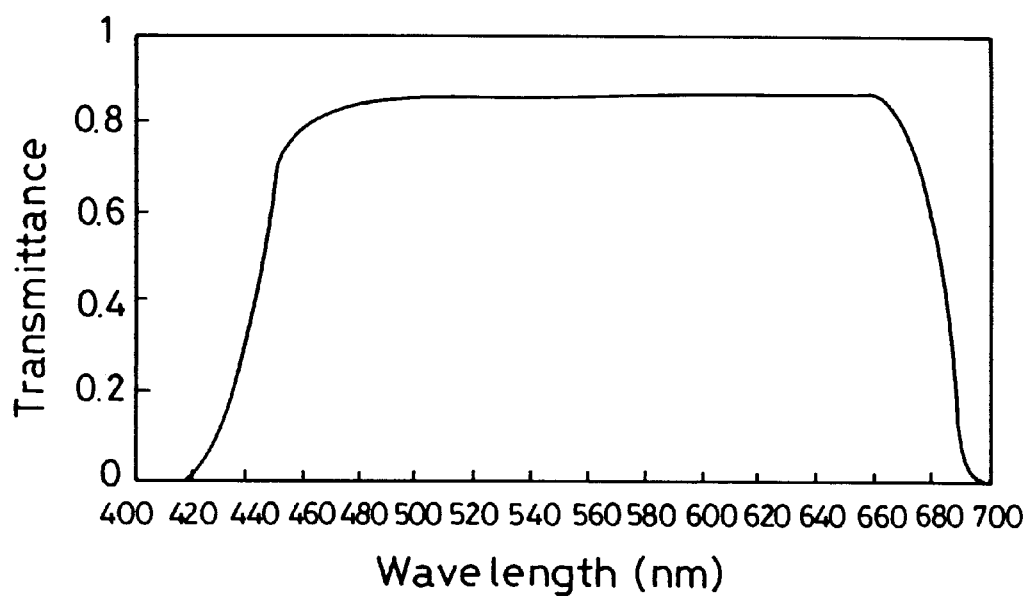
FIG. 9 is a diagram showing another example of the transmittance distribution of a wavelength band limiting device according to the present invention.
Figure 10:
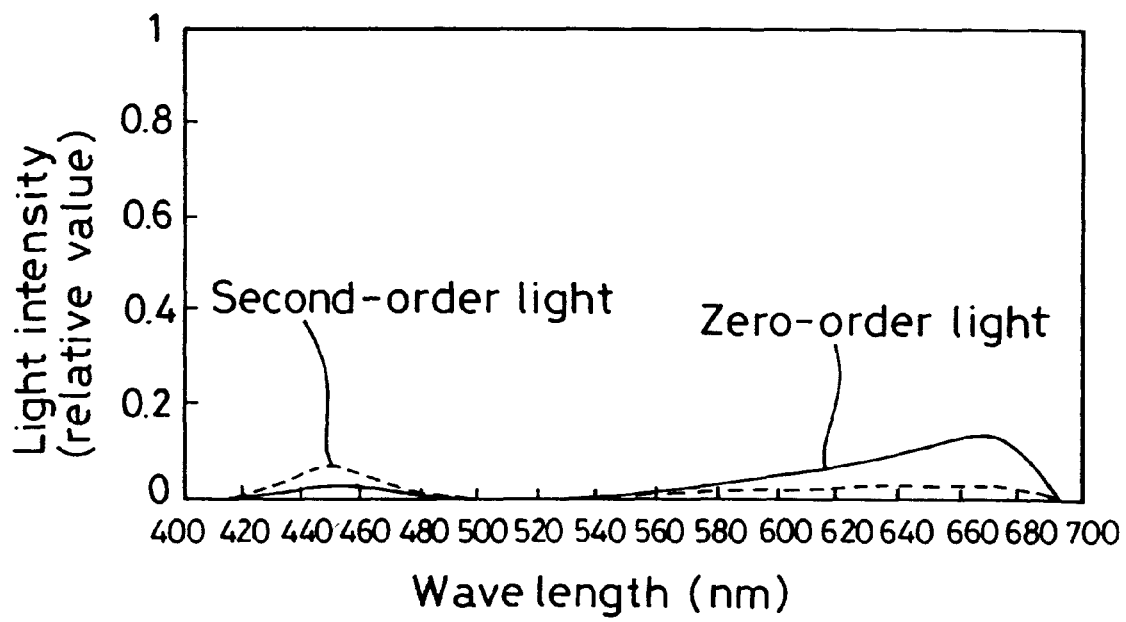
FIG. 10 is a diagram showing the relative intensity distribution of unwanted-order light in the case of using the wavelength band limiting device having the transmittance distribution shown in FIG. 9.
Figure 11:
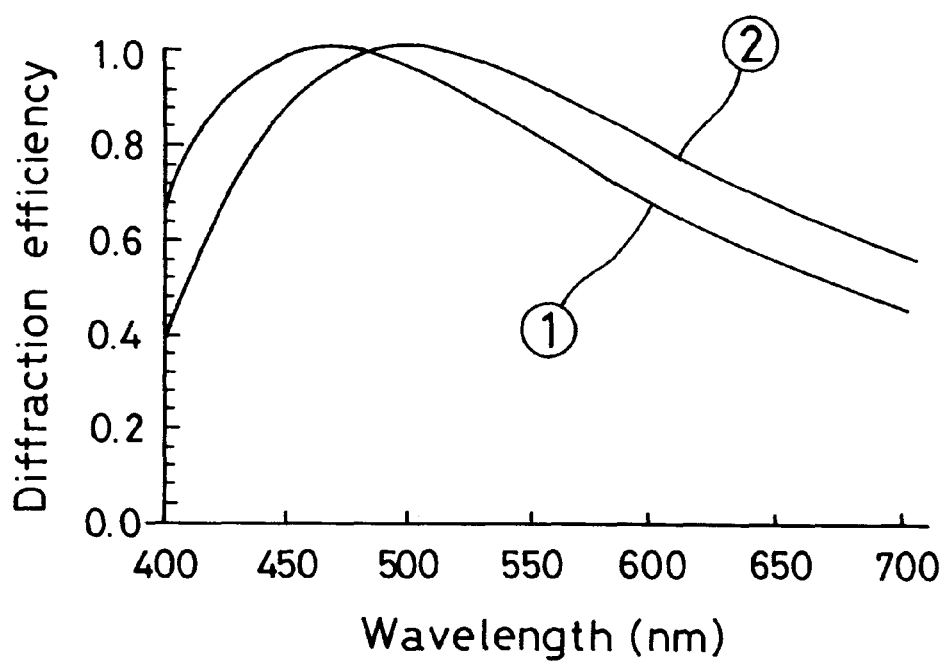
FIG. 11 is a diagram showing an example of the diffraction efficiency for first-order light of a relief type diffractive optical element with respect to two different optimization wavelengths.
Figure 12:
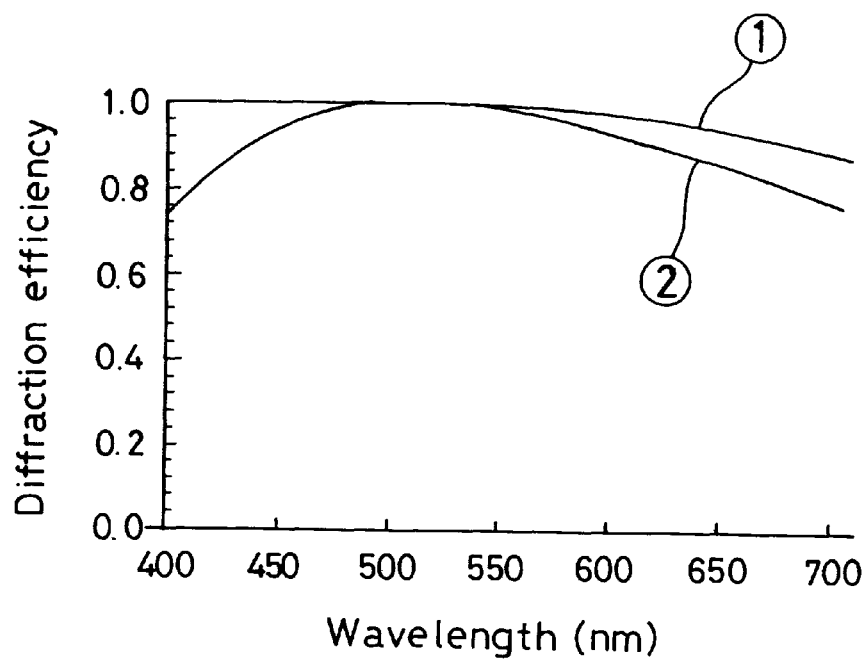
FIG. 12 is a diagram showing the wavelength dependence of the diffraction efficiency of a relief type diffractive optical element formed from a combination of a material of high refractive index and low dispersion and a material of low refractive index and high dispersion.
Figure 13:
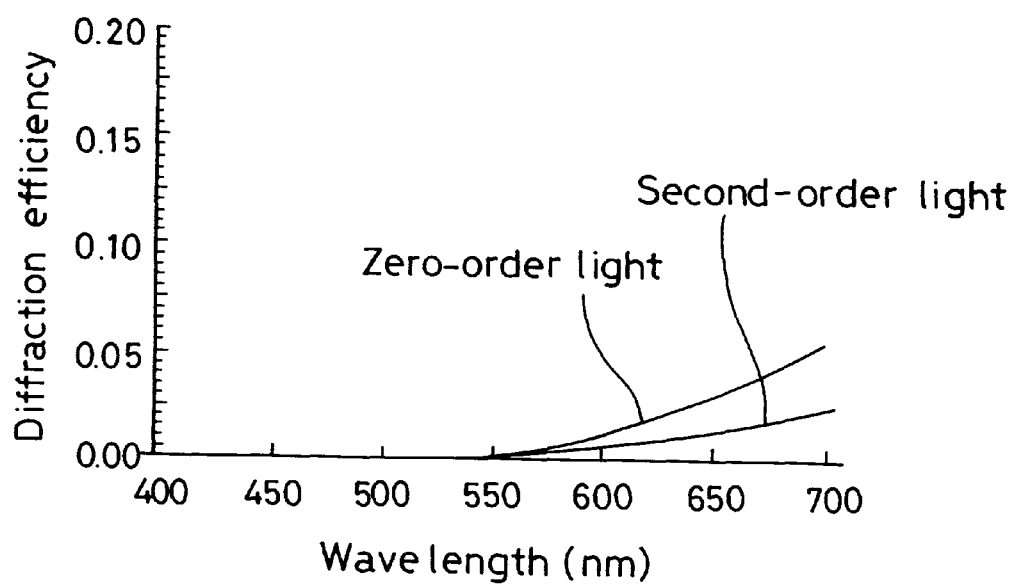
FIG. 13 is a diagram showing the diffraction efficiencies for zero-order light and second-order light in the case of the relief type diffractive optical element having the wavelength dependence shown in FIG. 12.
Figure 14:
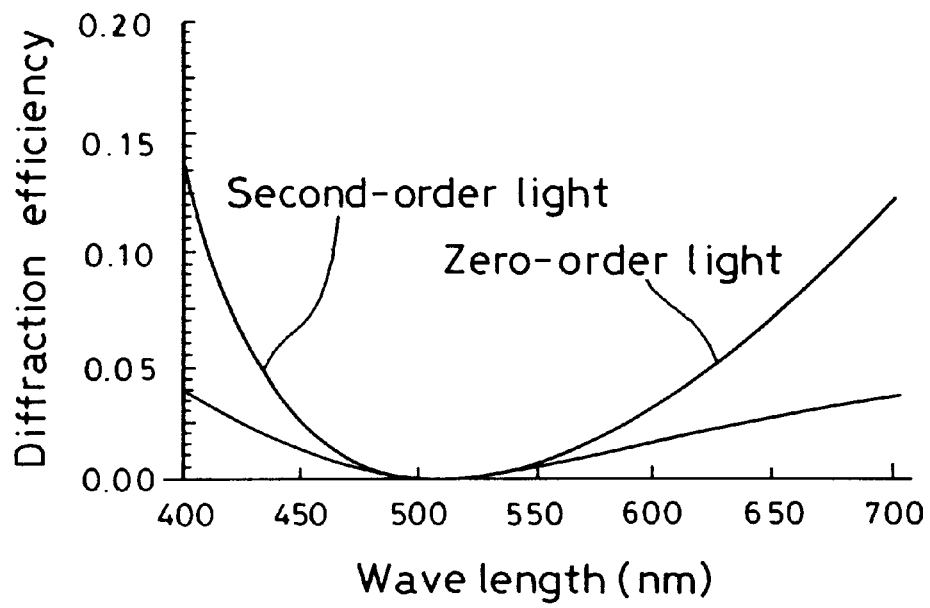
FIG. 14 is a diagram showing the diffraction efficiencies for zero-order light and second-order light in a case where the relief type diffractive optical element having the wavelength dependence shown in FIG. 12 is not provided with a protective layer.

Assuming that white light whose intensity is constant over the entire wavelength range is incident on the relief type diffractive optical element 2, the incident light is diffracted by the relief type diffractive optical element 2, and the relative intensity values of unwanted-order light after passing through the wavelength band limiting device 3 are such as those shown in FIG. 8. It should be noted that in this case, the intensity of light before entering the relief type diffractive optical element 2 is assumed to be 1. As will be understood from FIG. 8, the intensity of unwanted-order light is reduced to a considerable extent. Therefore, this embodiment makes it possible to reduce the intensity of diffracted light unnecessary for image formation to such an extent that the effect of unwanted-order light can be disregarded even when the diffraction efficiency for unwanted-order light is increased by providing the protective layer 5 on the relief type diffractive optical element 2. Thus, it is possible to reduce the effect of unwanted-order light, e.g. flare or ghost, and hence possible to obtain an image of high quality.

In addition, it is possible to obtain an optical system having excellent environmental resistance because it can incorporate the relief type diffractive optical element 2, which has the protective layer 5 provided on the diffraction surface without causing the image quality to be degraded. Furthermore, because the protective layer 5 is provided on the diffraction surface, it is possible to place the diffraction surface on the object side when the optical system is used in a telephoto lens system of a camera, for example. Thus, the degree of design freedom increases, and the application range can be enlarged.

Figure 7:
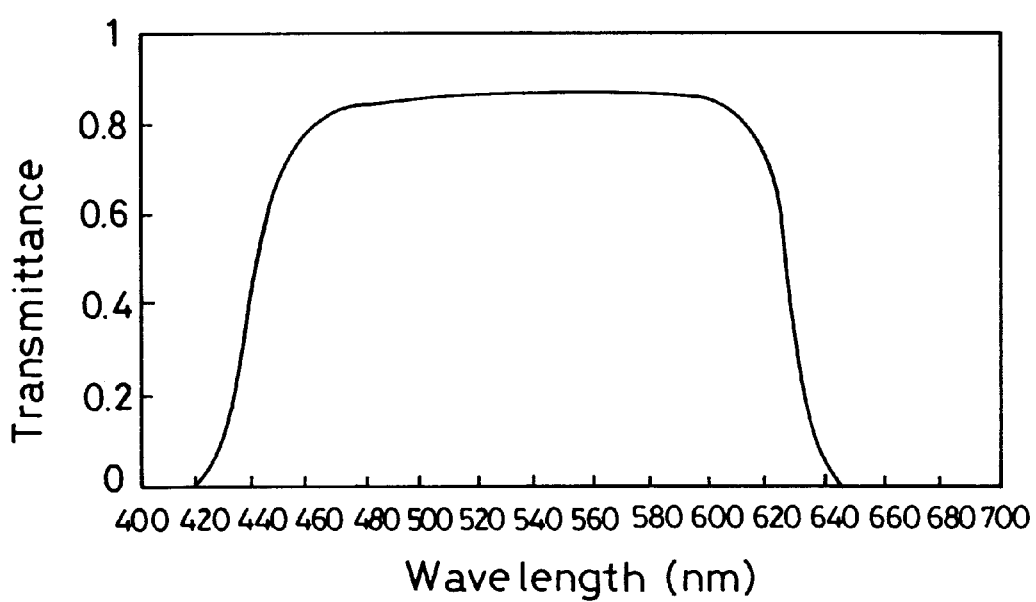
FIG. 7 is a diagram showing one example of the transmittance distribution of a wavelength band limiting device according to the present invention.

As the wavelength band limiting device 3, a filter whose transmittance depends on wavelengths can be used, e.g. an absorption filter or an interference filter. If a band-pass filter having a transmittance distribution such as that shown in FIG. 7 is used as the wavelength band limiting device 3, for example, it removes light of wavelength shorter than about 440 nanometers and light of wavelength longer than about 620 nanometers and efficiently transmits light in the wavelength range of from about 440 nanometers to about 620 nanometers. Thus, the intensity of unwanted-order light can be reduced.

Figure 17:
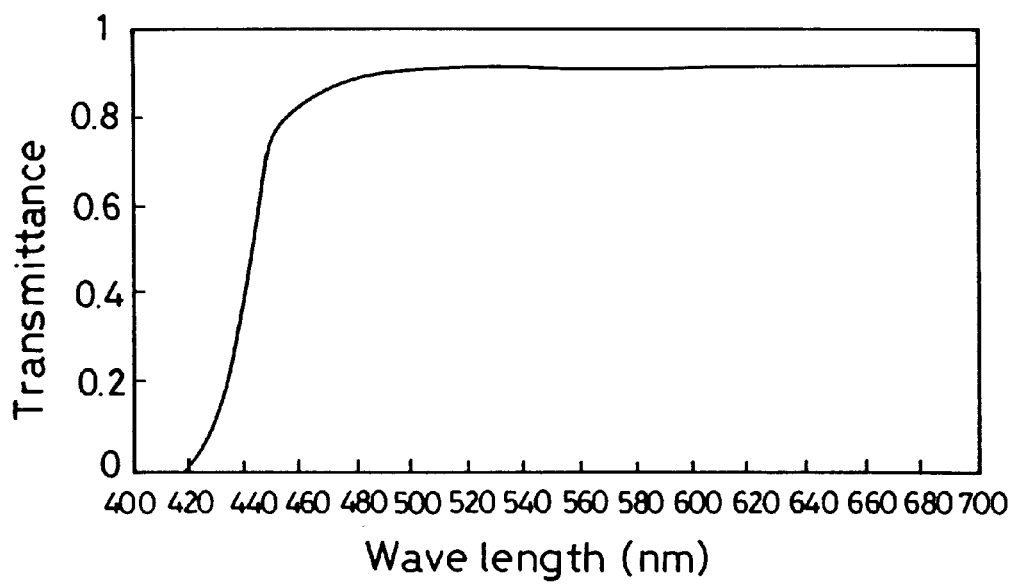
FIG. 17 is a diagram showing the spectral transmittance of one of two elements used to constitute a wavelength band limiting device according to the present invention.
Figure 18:
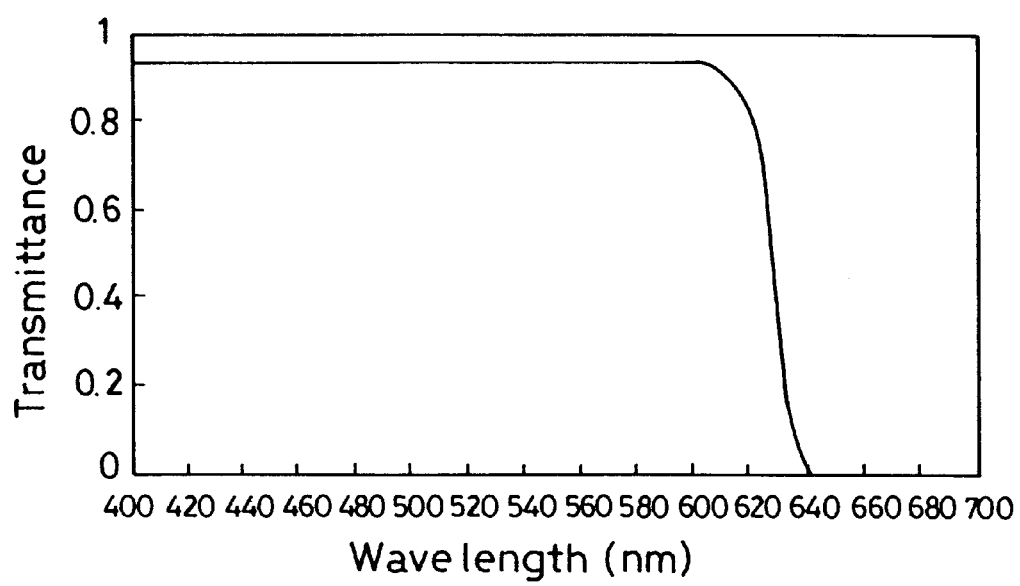
FIG. 18 is a diagram showing the spectral transmittance of the other of the two elements used to constitute a wavelength band limiting device according to the present invention.

The filter used as the wavelength band limiting device 3 does not always need to a band-pass filter. For example, it is also possible to use a combination of a filter having such a spectral transmittance that the transmittance lowers in the short wavelength region, as shown in FIG. 17, of the short and long wavelength regions in which the diffraction efficiency for unwanted-order light increases, and a filter having such a spectral transmittance that the transmittance lowers in the long wavelength region, as shown in FIG. 18, so that the filter combination has a transmittance distribution such as that shown in FIG. 7 as a whole.

The wavelength band limiting device 3 does not always need to be an element provided independently of the lens unit 1 and the relief type diffractive optical element 2 as shown schematically in FIG. 15. The wavelength band limiting device 3 may be constructed by providing a multilayer film on at least one surface of an optical element constituting the optical system. For example, one surface of one of the optical elements constituting the lens unit 1, e.g. a refracting lens, is provided with a multilayer film whose transmittance lowers in the short wavelength region of the two (short and long) wavelength regions in which the diffraction efficiency for unwanted-order light increases, and the other surface of the refracting lens is provided with a multilayer film whose transmittance lowers in the long wavelength region. By doing so, the intensity of white light passing through the refracting lens is reduced in the short and long wavelength regions, and the intensity of unwanted-order light is reduced.

If light in at least one of the short and long wavelength regions is removed by a multilayer film provided on at least one surface of an optical element constituting the optical system, it is not necessary to add an extra optical member because the multilayer film is provided on a surface of an optical element constituting the optical system from the beginning. Accordingly, it is possible to obtain a compact optical system having a minimal number of constituent elements.

It is also possible to form an optical element constituting the lens unit 1 from a material whose transmittance lowers in the wavelength regions where the diffraction efficiency for unwanted-order light increases. For example, if one of the optical elements constituting the lens unit 1 is formed from a material having a transmittance distribution such as that shown in FIG. 7, light in the wavelength regions where the diffraction efficiency for unwanted-order light increases is removed by the optical element. In this case also, the optical element, which constitutes the optical system from the beginning, has the function of limiting a wavelength band. Therefore, it is not necessary to add an extra optical member, and it is possible to obtain a compact optical system having a reduced number of constituent elements.

It is also possible to combine the above-described arrangements. For example, an optical element constituting the lens unit 1 is formed from a material whose transmittance is low in the short wavelength region, as shown in FIG. 17, of the short and long wavelength regions in which the diffraction efficiency for unwanted-order light increases, and a surface of this optical element is provided with a multilayer film whose transmittance is low in the long wavelength region, as shown in FIG. 18, so that the overall transmittance distribution is such as that shown in FIG. 7.

Although in FIG. 15 the lens unit 1, the relief type diffractive optical element 2 and the wavelength band limiting device 3 are placed successively in the order in which light travels, the arrangement is not necessarily limited thereto. The wavelength band limiting device 3 may be placed at any desired position in the optical path extending from the object to an element for detecting the image, e.g. a solid-state image pickup device, an eyeball, or a filter. With such an alternative arrangement, advantageous effects similar to the above can be obtained.

(Second Embodiment of Optical System)

Figure 19:
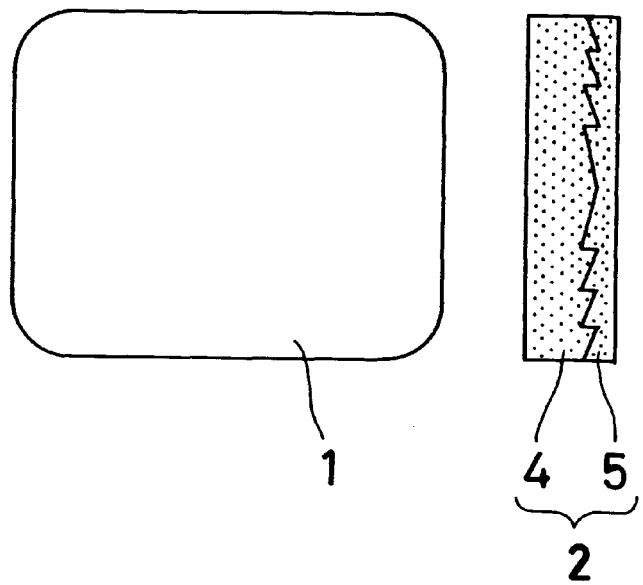
FIG. 19 is a diagram schematically showing a second embodiment of the optical system according to the present invention.

FIG. 19 is a diagram schematically showing a second embodiment of the optical system according to the present invention. The optical system has a lens unit 1 and a relief type diffractive optical element 2. The relief type diffractive optical element 2 includes a wavelength band limiting device. The wavelength band limiting device removes light in wavelength regions where the diffraction efficiency for orders of diffracted light unnecessary for image formation increases, and efficiently transmits light in a wavelength region where the diffraction efficiency for a working order of diffracted light used for image formation increases.

Band light from an object enters the lens unit 1 from the left side as viewed in the figure. After being refracted and transmitted by the lens unit 1, the incident light enters the relief type diffractive optical element 2. The light is diffracted by the relief type diffractive optical element 2 to produce a plurality of orders of diffracted light. Among them, an order of diffracted light necessary for image formation forms an image. On the other hand, orders of diffracted light unnecessary for image formation are removed by the wavelength band limiting device included in the relief type diffractive optical element 2. Accordingly, the intensity of the orders of diffracted light unnecessary for image formation can be reduced to such an extent that the effect of unwanted-order light can be disregarded even when a protective layer 5 is provided on the relief type diffractive optical element 2 as in the case of the first embodiment. Thus, it is possible to reduce the effect of unwanted-order light, e.g. flare or ghost, and hence possible to obtain an image of high quality.

Furthermore, because the relief type diffractive optical element 2 includes the wavelength band limiting device, unwanted-order light can be removed by the relief type diffractive optical element 2 itself. It is not necessary to add an extra element, and a compact optical system having a minimal number of constituent elements can be obtained.

An example of the wavelength band limiting device included in the relief type diffractive optical element 2 is the protective layer 5. In a case where the protective layer 5 is formed from a material having a transmittance distribution such as that shown in FIG. 7, for example, when white light is incident on the protective layer 5, light of wavelength shorter than about 440 nanometers and light of wavelength longer than about 620 nanometers cannot pass through the protective layer 5 and are removed. Light in the wavelength range of from about 440 nanometers to about 620 nanometers passes through the protective layer 5 efficiently.

Assuming that white light whose intensity is constant over the entire wavelength range is incident on the relief type diffractive optical element 2, the incident light is diffracted by the relief type diffractive optical element 2, and the relative intensity values of unwanted-order light after passing through the protective layer 5 of the relief type diffractive optical element 2 are such as those shown in FIG. 8. It should be noted that in this case, the intensity of light before entering the relief type diffractive optical element 2 is assumed to be 1. As will be understood from FIG. 8, the intensity of orders of diffracted light unnecessary for image formation can be reduced to such an extent that the effect of unwanted-order light can be disregarded even when the protective layer 5 is provided on the relief type diffractive optical element 2. Thus, it is possible to reduce the effect of unwanted-order light, e.g. flare or ghost, and hence possible to obtain an image of high quality.

Figure 20:
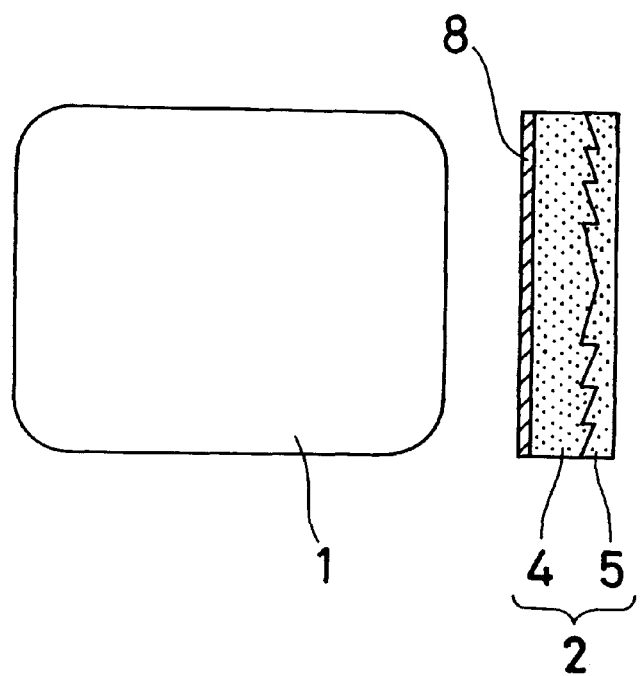
FIG. 20 is a diagram schematically showing a modification of the second embodiment of the optical system according to the present invention.

Another example of the wavelength band limiting device is, as shown in FIG. 20, a multilayer film 8 provided on a surface of the relief type diffractive optical element 2 that is reverse to a side thereof on which the protective layer 5 is provided. In this case, for example, the protective layer 5 is arranged to exhibit a low transmittance in the short wavelength region, as shown in FIG. 17, of the short and long wavelength regions in which the diffraction efficiency for unwanted-order light increases, and the multilayer film 8 is arranged to exhibit a low transmittance in the long wavelength region as shown in FIG. 18. With this arrangement, the overall transmittance distribution is such as that shown in FIG. 7. Thus, the wavelength band limiting device removes unwanted-order light and efficiently transmits light in the wavelength band used for image formation.

In this case also, the intensity of orders of diffracted light unnecessary for image formation can be reduced to such an extent that the effect of unwanted-order light can be disregarded even when the protective layer 5 is provided on the relief type diffractive optical element 2. Thus, it is possible to reduce the effect of unwanted-order light, e.g. flare or ghost, and hence possible to obtain an image of high quality.

(Third Embodiment of Optical System)

Figure 21:
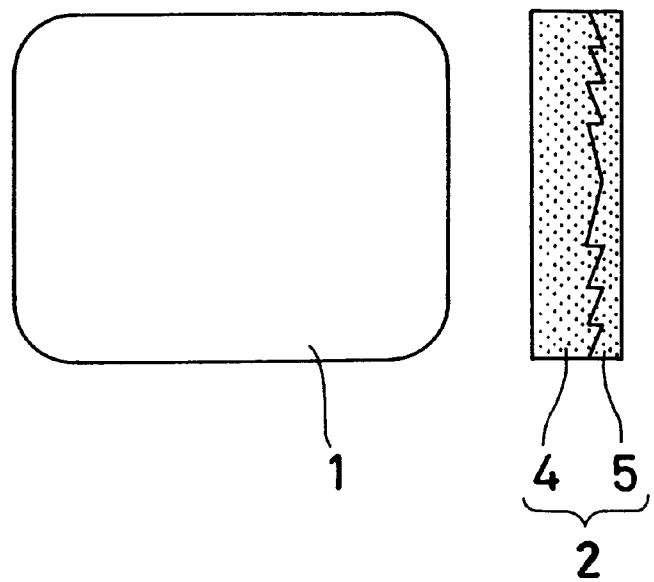
FIG. 21 is a diagram schematically showing a third embodiment of the optical system according to the present invention.

FIG. 21 is a diagram schematically showing a third embodiment of the optical system according to the present invention. The optical system has a lens unit 1 and a relief type diffractive optical element 2. A wavelength band limiting device is formed from the relief type diffractive optical element 2 and at least a part of optical elements constituting the optical system other than the relief type diffractive optical element 2. The wavelength band limiting device removes light in wavelength regions where the diffraction efficiency for orders of diffracted light unnecessary for image formation increases, and efficiently transmits light in a wavelength region where the diffraction efficiency for a working order of diffracted light used for image formation increases.

For example, the relief type diffractive optical element 2 has a device whose transmittance is low in the short wavelength region, as shown in FIG. 17, of the short and long wavelength regions in which the diffraction efficiency for unwanted-order light increases, and at least a part of optical elements constituting the optical system other than the relief type diffractive optical element 2 has a device whose transmittance is low in the long wavelength region, as shown in FIG. 18. In this case, the wavelength band limiting device comprising these devices has a transmittance distribution such as that shown in FIG. 7 as a whole.

Accordingly, when white light enters the optical system, light in the wavelength regions where the diffraction efficiency for unwanted-order light increases is removed, whereas light in the wavelength region used for image formation is transmitted efficiently. Therefore, the intensity of orders of diffracted light unnecessary for image formation can be reduced to such an extent that the effect of unwanted-order light can be disregarded even when the protective layer 5 is provided on the relief type diffractive optical element 2 as in the case of the first and second embodiments. Thus, it is possible to reduce the effect of unwanted-order light, e.g. flare or ghost, and hence possible to obtain an image of high quality.

Furthermore, the relief type diffractive optical element 2 per se can remove unwanted-order light in the short or long wavelength region. Therefore, it is unnecessary to add an extra optical member for removing unwanted-order light in that wavelength region, and a compact optical system having a minimal number of constituent elements can be obtained.

An example of the device provided on the relief type diffractive optical element 2 to constitute a part of the wavelength band limiting device is the protective layer 5. For example, the protective layer 5 is formed from a material having a low transmittance in one of the short and long wavelength regions where the diffraction efficiency for unwanted-order light increases. Consequently, band light incident on the relief type diffractive optical element 2 is diffracted. At the same time, the protective layer 5 removes light in one of the wavelength regions where the diffraction efficiency for unwanted-order light increases, and efficiently transmits light in the wavelength region used for image formation. Because a part of unwanted-order light is removed by the protective layer 5 that is needed from the beginning, the relief type diffractive optical element 2 can be readily obtained simply by forming the protective layer 5 without need of taking special measures.

Another example of the device provided on the relief type diffractive optical element 2 to constitute a part of the wavelength band limiting device is a multilayer film formed on a surface of the relief type diffractive optical element 2 that is reverse to a side thereof on which the protective layer 5 is provided. If a multilayer film is formed such that the transmittance lowers in one of the short and long wavelength regions where the diffraction efficiency for unwanted-order light increases, it is possible to remove light in the short or long wavelength region among unwanted-order light as in the case of removing a part of unwanted-order light by the protective layer 5. In this case, the material constituting the protective layer 5 is only required to be transparent in the wavelength region used for image formation. Accordingly, the number of usable materials increases, and implementability improves.

On the other hand, an example of the device provided on at least a part of optical elements constituting the optical system other than the relief type diffractive optical element 2 to constitute a part of the wavelength band limiting device is a multilayer film provided on at least one surface of an optical element constituting the optical system. For example, a multilayer film whose transmittance lowers in one wavelength region where unwanted-order light is not removed by the relief type diffractive optical element 2, of the wavelength regions where the diffraction efficiency for unwanted-order light increases, is provided on a surface of one of the optical elements constituting the lens unit 1, e.g. a refracting lens. Because the multilayer film is provided on an element that is needed for the optical system from the beginning, it is unnecessary to add an extra optical member. Accordingly, it is possible to obtain a compact optical system having a minimal number of constituent elements.

Figure 22:
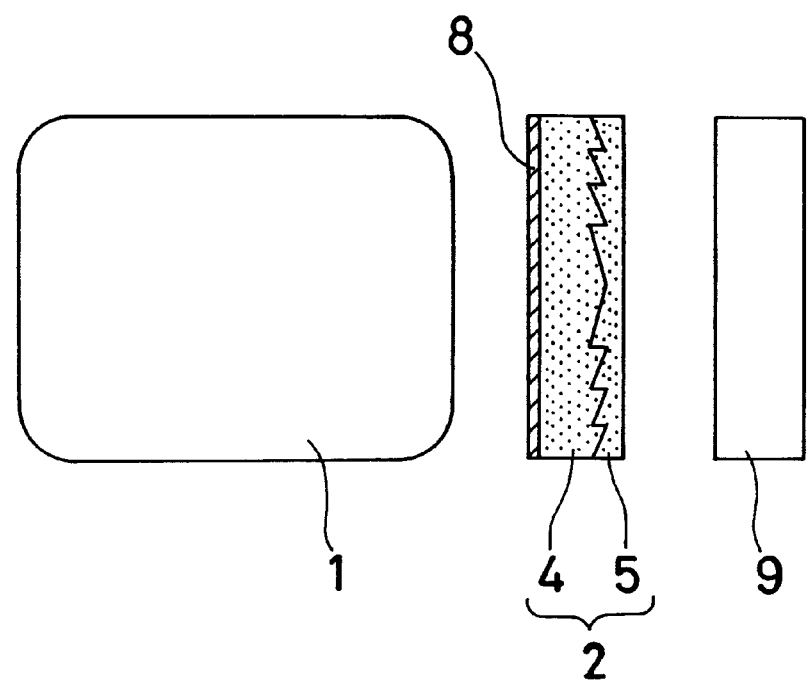
FIG. 22 is a diagram schematically showing a modification of the third embodiment of the optical system according to the present invention.

Another example of the device provided on at least one of optical elements constituting the optical system other than the relief type diffractive optical element 2 to constitute a part of the wavelength band limiting device is an optical element constituting the lens unit 1 that is formed from a material whose transmittance lowers in one wavelength region where unwanted-order light is not removed by the relief type diffractive optical element 2, of the wavelength regions where the diffraction efficiency for unwanted-order light increases. It is also possible to add, as shown in FIG. 22, an optical member 9 whose transmittance lowers in one wavelength region where unwanted-order light is not removed by the relief type diffractive optical element 2, of the wavelength regions where the diffraction efficiency for unwanted-order light increases. In either case, a part of unwanted-order light can be removed as in the case of providing the multilayer film.

In the foregoing first to third embodiments, the wavelength band limiting device is preferably arranged such that, in an object wavelength band where the quantity of orders of diffracted light unnecessary for image formation may reach a level at which the effect of unwanted-order light cannot be disregarded, the ratio of the quantity ($A_0$) of orders of diffracted light unnecessary for image formation to the total light quantity ($A_a$) in the object wavelength band satisfies the following condition:

$$0 < A_0/A_a < 0.1 \tag{1}$$

As has already been stated above, if the condition (1) is satisfied, it becomes possible to ignore the degradation of the image quality due to the orders of diffracted light unnecessary for image formation.

More specifically, when a wavelength band is limited in a shorter wavelength region than the optimization wavelength $\lambda_O$, it is desirable that the wavelength $\lambda_S$ at which the light quantity is cut by 50%, that is, at which the transmittance of the wavelength band limiting device is 50%, should satisfy the following condition (2):

$$\lambda_S/\lambda_O < 0.95 \tag{2}$$

When a wavelength band is limited in a longer wavelength region than the optimization wavelength $\lambda_O$, it is desirable that the wavelength $\lambda_L$ at which the light quantity is cut by 50%, that is, at which the transmittance of the wavelength band limiting device is 50%, should satisfy the following condition (3):

$$\lambda_L/\lambda_O > 1.2 \tag{3}$$

If $\lambda_S/\lambda_O$ or $\lambda_L/\lambda_O$ falls outside the range defined by the condition (2) or (3), the wavelength band width for forming a color image narrows, and it may become impossible to maintain satisfactory color reproduction, as has already been stated above.

Incidentally, as stated above, the diffraction efficiency for wavelengths of the relief type diffractive optical element reduces at both short and long wavelength sides with respect to the optimization wavelength $\lambda_O$. When a protective layer is formed on the relief type diffractive optical element, the reduction in the diffraction efficiency may increase particularly at the short wavelength side. For this reason, in order to maintain favorable color reproduction and to reduce the effect of the orders of diffracted light unnecessary for image formation satisfactorily, it is desirable to determine the optimization wavelength $\lambda_O$ such that the following condition is satisfied with respect to a working wavelength band $\lambda_1 < \lambda < \lambda_2$:

$$|C_1 - C_2| < 20\% \tag{4}$$

where:

$C_1$: the diffraction efficiency (%) for the working order of diffracted light at the wavelength $\lambda_1$ when the working order of diffracted light is optimized at the wavelength $\lambda_O$;

$C_2$: the diffraction efficiency (%) for the working order of diffracted light at the wavelength $\lambda_2$ when the working order of diffracted light is optimized at the wavelength $\lambda_O$.

As has already been stated above, if the above $|C_1 - C_2|$ is not smaller than the upper limit of the condition (4), the quantity of unwanted-order diffracted light increases in the short or long wavelength region, causing the image quality to be degraded considerably. Therefore, if the wavelength bands are limited as stated above, it becomes difficult to maintain the required color balance.

It should be noted that, as has already been stated above, it is more desirable to satisfy at least one of the following conditions (5) to (8) in place of the above conditions (1) to (4):

$$0 < A_0/A_a < 0.05 \tag{5}$$

$$\lambda_S/\lambda_O < 0.94 \tag{6}$$

$$\lambda_L/\lambda_O > 1.22 \tag{7}$$

$$|C_1 - C_2| < 10\% \tag{8}$$

It is even more desirable to satisfy the following condition (9):

$$|C_1 - C_2| < 5\% \tag{9}$$

By satisfying the above conditions (1) to (9), it is possible to obtain an optical system capable of satisfactorily reducing the effect of unwanted-order light and maintaining satisfactory color reproduction and thus forming an image of high quality.

Incidentally, it is particularly preferable that the wavelength $\lambda_1$ should be 400 nanometers, and the wavelength $\lambda_2$ should be 700 nanometers. In this case, the working wavelength band is a visible wavelength region ranging from 400 nanometers to 700 nanometers. Accordingly, the use of this optical system makes it possible to obtain an apparatus that enables visual observation. There are a large number of apparatuses in which images of visible light are observed or photographically recorded, e.g. cameras, microscopes, and endoscopes. Thus, if the working wavelength band is from 400 nanometers to 700 nanometers, the optical system can be used in various apparatuses in which images of visible light are observed. Thus, an optical system having a wide applicable range can be obtained.

Figure 23:
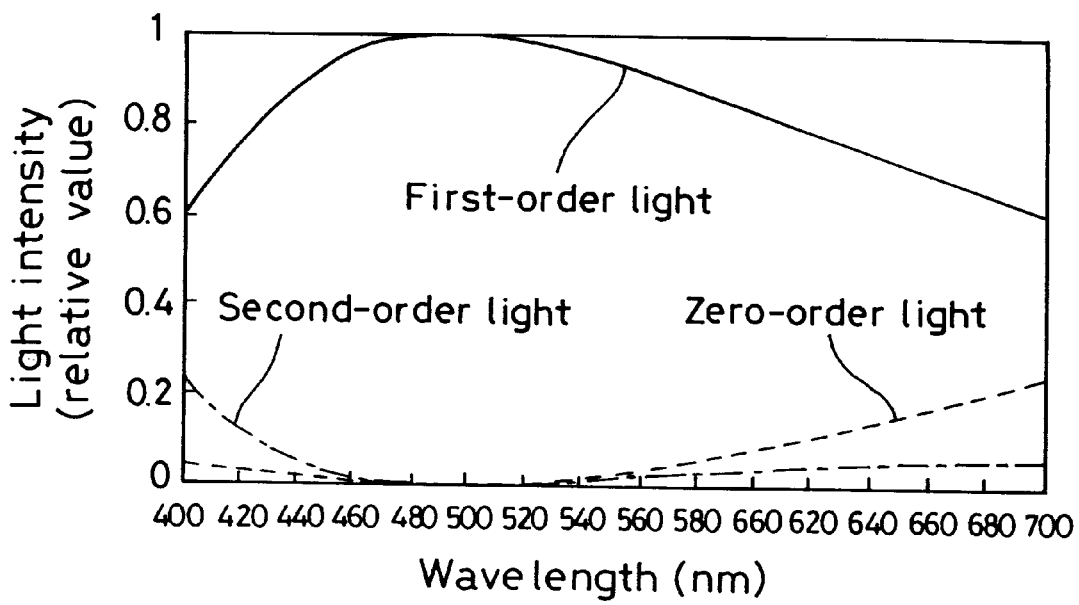
FIG. 23 is a diagram showing the diffraction efficiencies for first-order light and unwanted-order light of a relief type diffractive optical element in one specific example of the present invention.

Let us assume that, in the arrangement shown in FIG. 15, for example, the optical member 4 of the relief type diffractive optical element 2 that has a relief configuration on a surface thereof is formed from PMMA, and the protective layer 5 of the relief type diffractive optical element 2 is formed from PC, and further first-order diffracted light is optimized at the wavelength of 490 nanometers. In this case, the diffraction efficiencies of the relief type diffractive optical element 2 for first-order light and zero- and second-order light, which are unwanted-order light, are such as those shown in FIG. 23. Assuming that the working wavelength band is from 400 nanometers to 700 nanometers, $|C_1-C_2|$ is about 4%, which satisfies the condition (9).

Figure 24:
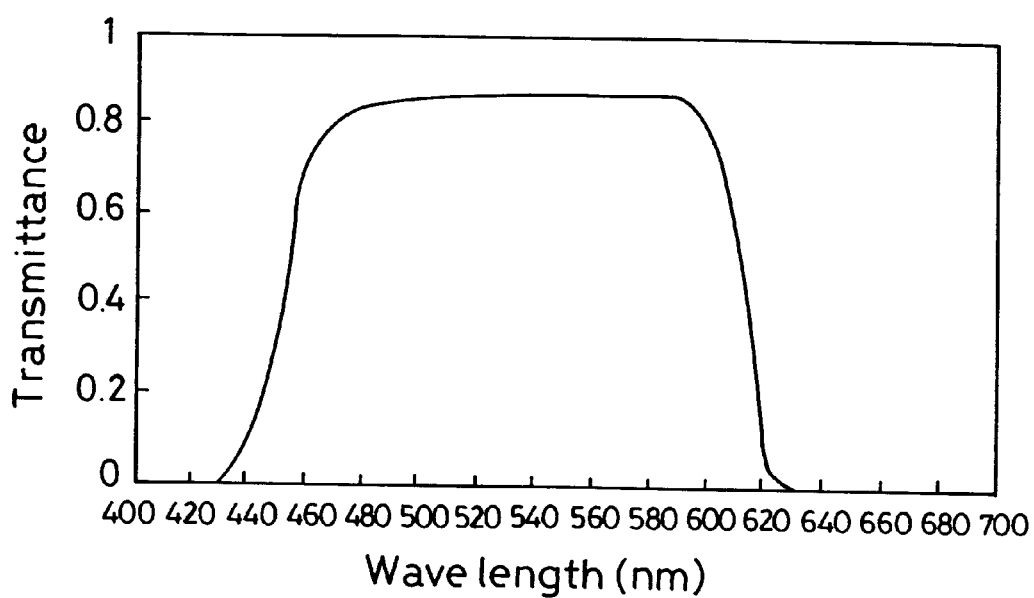
FIG. 24 is a diagram showing the spectral transmittance of a wavelength band limiting device used in the case of FIG. 23.
Figure 25:
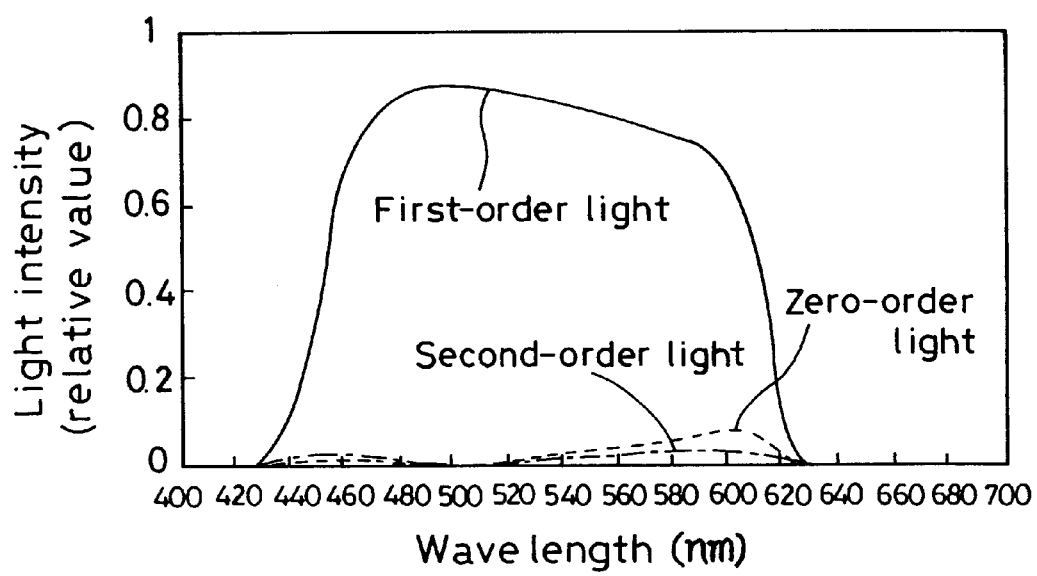
FIG. 25 is a diagram showing the relative intensity distributions of first-order light, zero-order light and second-order light in one specific example of the present invention.

Here, the wavelength band limiting device 3 is arranged such that the spectral transmittance is such as that shown in FIG. 24. Consequently, when white light enters the optical system, first-order light and zero- and second-order light passing through the optical system have relative intensity distributions as shown in FIG. 25. It should be noted that the intensity of light incident on the optical system is assumed to be constant independently of wavelengths and assumed to be 1. In this case, the ratio of the quantity of unwanted-order light (zero- and second-order light) to the total light quantity in the wavelength band of 400 nanometers to 700 nanometers is about 0.046, which satisfies the condition (5).

As will be understood from FIG. 24, the wavelengths $\lambda_S$ and $\lambda_L$ at which the transmittance of the wavelength band limiting device 3 is 50% are about 453 nanometers and about 610 nanometers, respectively. Because the optimization wavelength $\lambda_0$ is 490 nanometers, $\lambda_S/\lambda_0$ is about 0.92, and $\lambda_L/\lambda_0$ is about 1.24. Therefore, the conditions (6) and (7) are also satisfied.

Accordingly, the optical system arranged as stated above is capable of satisfactorily reducing the effect of unwanted-order light and providing favorable color reproduction and thus forming an image of high quality.

Furthermore, it is desirable that the wavelength band limiting device in the foregoing embodiments should be detachable. In detection of an image formed by an image-forming optical system, because wavelength sensitivity characteristics differ for each device used to receive light, it is necessary to form an image using light having an optimum wavelength band and wavelength intensity distribution for each device. The optical system according to the present invention may be used in various circumstances, e.g. visual observation of an object image, observation of an object image through a monitor by receiving light with a CCD camera, and photographing an object image using a photographic film. If the wavelength band limiting device is detachable, it can be readily replaced with another wavelength band limiting device so that light in a wavelength band suitable for each particular circumstance is incident with a wavelength intensity distribution suitable for each particular circumstance. Thus, it is possible to obtain an optical system of excellent general-purpose properties that is compatible with various image pickup apparatuses.

In the foregoing embodiments, the relief type diffractive optical element 2 is not necessarily limited to the one that is shown in FIG. 16, in which a flat plate-shaped substrate 6 has a relief pattern 7 formed on a surface thereof. The relief type diffractive optical element 2 may be constructed by forming a relief pattern 7 on a spherical or aspherical substrate. The relief pattern 7 is not necessarily limited to a concentric circle pattern. The relief pattern 7 may be changed in accordance with the function of the image-forming optical system. For example, when rotationally asymmetric image-forming performance is needed, the relief pattern 7 may be formed in the shape of an elliptic pattern. Alternatively, the relief pattern 7 may be formed in the shape of a parallel pattern so as to have a function equal to that of a cylindrical lens. Although in the described embodiments first-order light is used for image formation, it is also possible to use a higher order of diffracted light.

In the foregoing embodiments, the optical member 4 having a relief configuration on a surface thereof, which constitutes the relief type diffractive optical element 2, is formed from BSL7 or PMMA, and the protective layer 5 is formed from PC. However, the materials for the optical member 4 and the protective layer 5 are not necessarily limited to those stated above. BSL7 and PMMA have a low refractive index and low dispersion in comparison to PC, and PC has a high refractive index and high dispersion in comparison to BSL7 and PMMA. If the optical member 4 and the protective layer 5 are formed by using such a combination of materials, the number of materials usable in combination increases, as has already been stated above. In addition, because the refractive index difference between the optical member 4 and the protective layer 5 becomes large, the groove depth of the relief pattern 7 can be reduced, and the production becomes easy. Furthermore, optical plastic materials can be used. Therefore, it becomes possible to obtain an easy-to-produce and low-cost relief type diffractive optical element. Accordingly, the optical system can be produced at reduced cost.

The optical member 4 and the protective layer 5 may be formed from a combination of a material of high refractive index and low dispersion and a material of low refractive index and high dispersion in comparison to each other. One example of this combination is LAL56 and PC. LAL56 has a high refractive index and low dispersion in comparison to PC. PC has a low refractive index and high dispersion in comparison to LAL56. As has already been stated above, such a combination of materials makes it possible to reduce the wavelength dependence of the diffraction efficiency of the relief type diffractive optical element 2. Consequently, the diffraction efficiency for the order of diffracted light used for image formation becomes high over the entire wavelength range, whereas the diffraction efficiency for unwanted-order light lowers. Therefore, the effect of unwanted-order light is further reduced, and an image of high quality can be obtained. Furthermore, the wavelength bands to be limited by the wavelength band limiting device narrow, and the wavelength band usable for image formation widens. Accordingly, it becomes possible to obtain an image of even more favorable color reproduction.

(First Embodiment of Image Pickup Apparatus)

Figure 26:
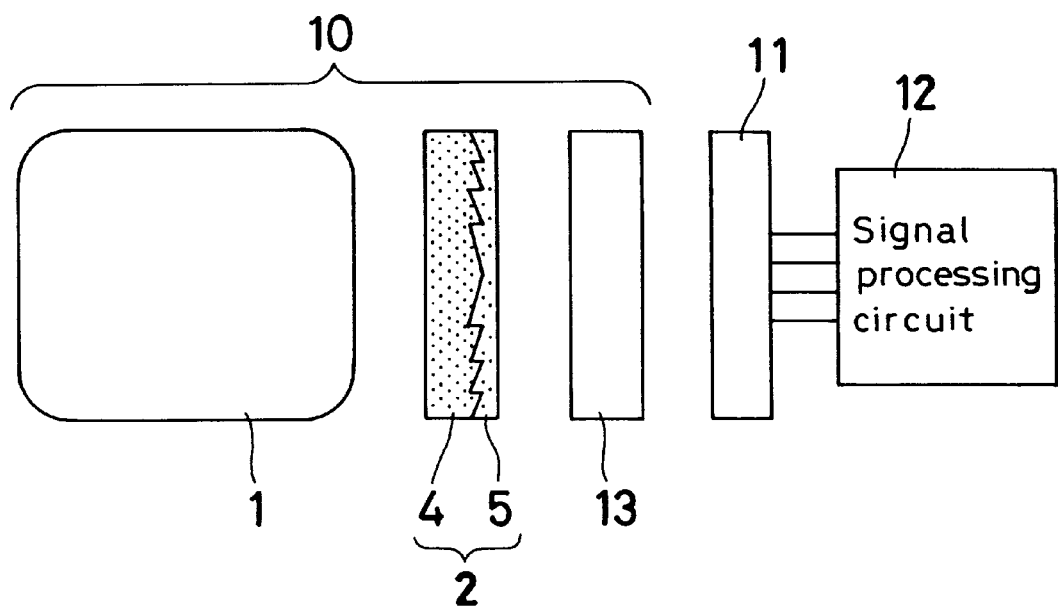
FIG. 26 is a diagram schematically showing a first embodiment of the image pickup apparatus according to the present invention.

FIG. 26 is a diagram schematically showing a first embodiment of the image pickup apparatus according to the present invention. The image pickup apparatus is arranged such that an image of an object is formed on a photoelectric conversion surface of a solid-state image pickup device 11 as an electronic image pickup device through an optical system 10, and the output signal from the solid-state image pickup device 11 is processed in a signal processing circuit 12 to obtain an image signal. The optical system 10 is the same as the first embodiment of the optical system according to the present invention. The optical system 10 has a lens unit 1, a relief type diffractive optical element 2, and an optical member 13 including a wavelength band limiting device.

As has been stated in regard to the first embodiment of the optical system, the relief type diffractive optical element 2 includes an optical member 4 having a relief configuration on a surface thereof, and a protective layer 5. The optical member 13 is provided with a wavelength band limiting device having a spectral transmittance shown in FIG. 27. The optical member 13 is further provided with a low-pass filter. The solid-state image pickup device 11 has mosaic color filters for primary colors, i.e. R, G and B, which are provided on the photoelectric conversion surface thereof. The color filters have spectral characteristics shown in FIG. 28.

Thus, in the solid-state image pickup device 11, the image of the object that is formed through the optical system 10 is converted into electric signals according to the light intensity and supplied to the signal processing circuit 12. In the signal processing circuit 12, the electric signals are converted into a color image signal by performing correction so that color information concerning the object is not impaired, using an appropriate method according to need, for example, by normalizing the signal intensity for each of the primary colors, i.e. R, G and B, or shifting colors for representation. The color image signal is written into a memory (not shown) or outputted to an external device, e.g. a personal computer, a display unit, or a printer. It should be noted that the signal processing operation is controlled by an external controller or a CPU incorporated into the image pickup apparatus.

Figure 29:
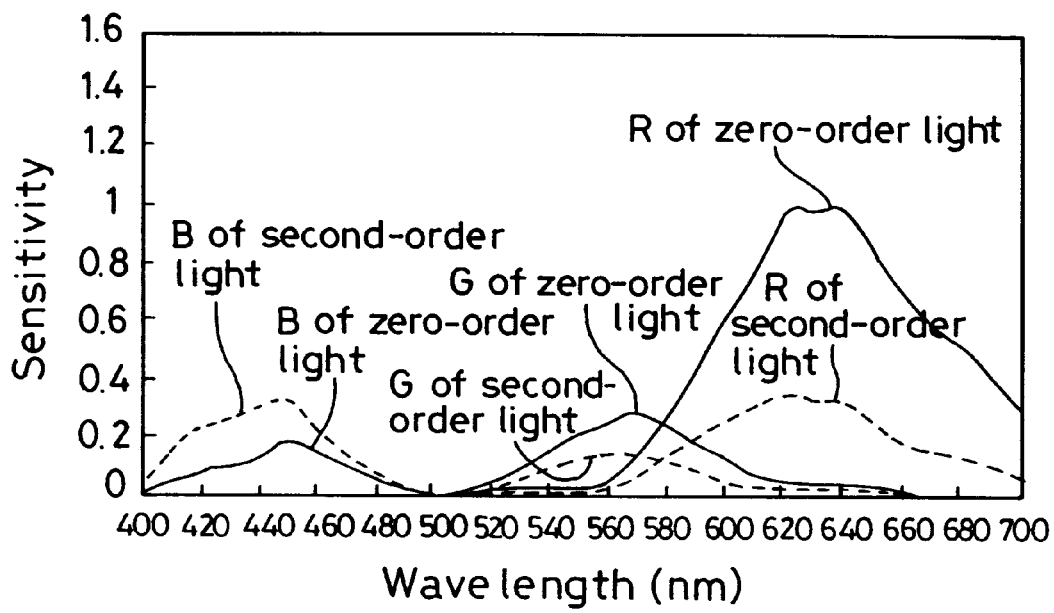
FIG. 29 is a diagram showing the spectral characteristics of zero-order light and second-order light in a case where the image pickup apparatus shown in FIG. 26 does not include a wavelength band limiting device.

FIG. 29 shows the spectral characteristics of zero-order light and second-order light through the relief type diffractive optical element 2 that are incident on the solid-state image pickup device 11 in a case where the optical member 13 in the arrangement shown in FIG. 26 does not include a wavelength band limiting device.

Figure 27:
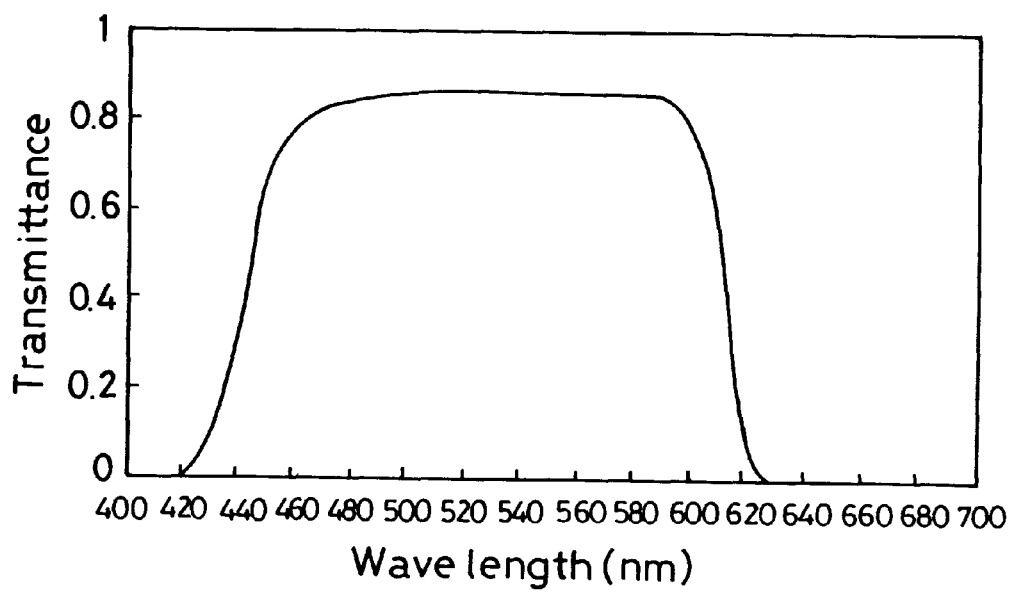
FIG. 27 is a diagram showing the spectral transmittance of a wavelength band limiting device used in the image pickup apparatus shown in FIG. 26.
Figure 28:
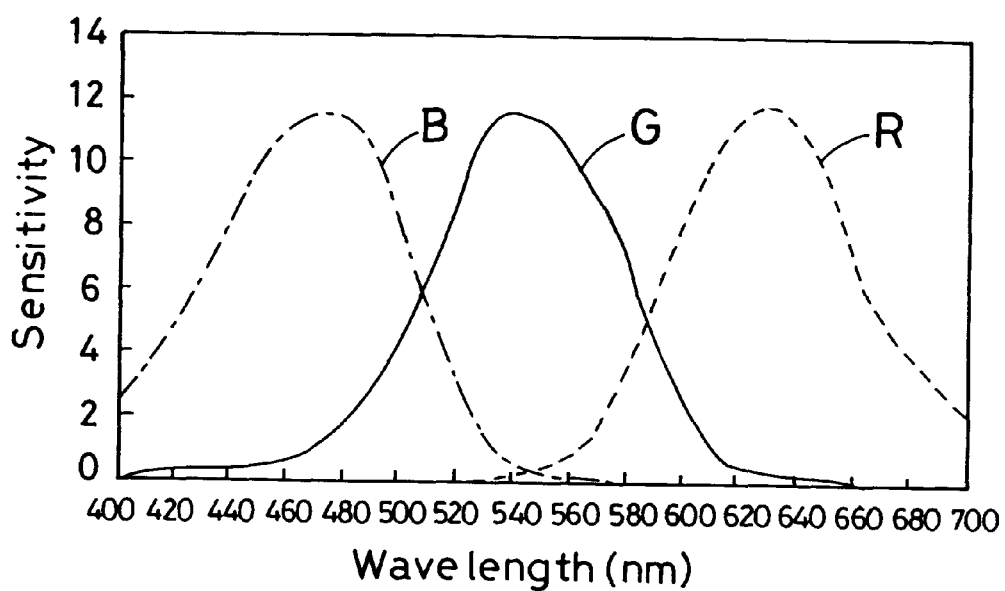
FIG. 28 is a diagram showing the spectral characteristics of color filters used in the image pickup apparatus shown in FIG. 26.
Figure 30:
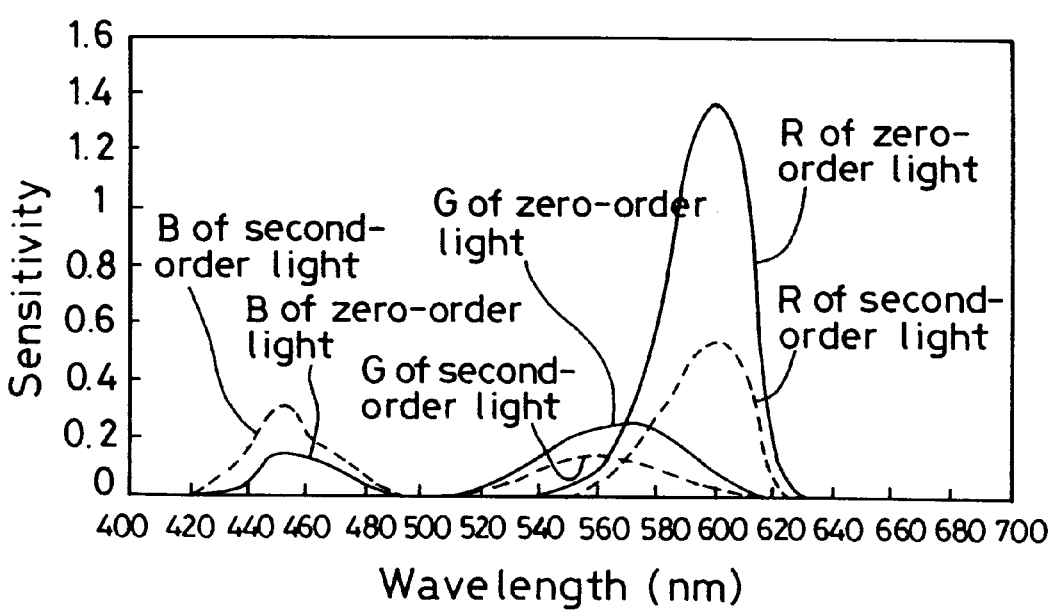
FIG. 30 is a diagram showing the spectral characteristics of zero-order light and second-order light in a case where the image pickup apparatus shown in FIG. 26 is provided with a wavelength band limiting device.

FIG. 30 shows the spectral characteristics of zero-order light and second-order light in a case where the optical member 13 in this embodiment is provided with a wavelength band limiting device having the spectral transmittance shown in FIG. 27, as stated above. In this case, it is assumed that the optical member 4 having a relief configuration on a surface thereof, which constitutes the relief type diffractive optical element 2, is formed from PMMA, and the protective layer 5 is formed from PC, and further the optimization wavelength $\lambda_0$ is 500 nanometers. FIGS. 29 and 30 both show the spectral characteristics after white balance has been attained with respect to G. The spectral characteristics shown in FIG. 30 have been compensated for the reduction in the light quantity through the wavelength band limiting device by amplification.

In FIG. 29, in which the quantity of unwanted-order light is not reduced, the ratio of the quantity of zero- and second-order light, which are unwanted-order light, to the total light quantity for each of R, G and B is as follow: 0.143 for R; 0.033 for G; and 0.032 for B. The ratio of the quantity of unwanted-order light to the total light quantity is particularly high for R. Therefore, there is a possibility that red flare or ghost will appear. In FIG. 30, in which the quantity of unwanted-order light is reduced, the ratio of the quantity of zero- and second-order light to the total light quantity is 0.090 for R, 0.031 for G, and 0.020 for B. The effect of unwanted-order light is reduced particularly for R. Therefore, it is possible according to this embodiment to reduce the intensity of the orders of diffracted light unnecessary for image formation to such an extent that the effect of unwanted-order light can be disregarded even when the protective layer 5 is provided on the relief type diffractive optical element 2.

Although in this embodiment the wavelength band limiting device is provided on the optical member 13, it may be placed in front of the lens unit 1 or at any desired position in the optical path extending from the lens unit 1 to the photoelectric conversion surface of the solid-state image pickup device 11. With such an alternative arrangement, advantageous effects similar to the above can be obtained. In particular, if a cover glass that covers the photoelectric conversion surface of the solid-state image pickup device 11 is formed by using a wavelength band limiting device, e.g. a wavelength band limiting filter, it is possible to effectively reduce the number of constituent elements and achieve a compact system of optical apparatus.

Although this embodiment uses as the optical system 10 the optical system stated in the description of the first embodiment of the image-forming optical system, it is also possible to use the optical system stated in the description of the second or third embodiment of the optical system. In either case, the intensity of the orders of diffracted light unnecessary for image formation can be reduced to such an extent that the effect of unwanted-order light can be disregarded even when the protective layer 5 is provided on the relief type diffractive optical element 2. Thus, it is possible to obtain an image pickup apparatus capable of taking a high-quality object image that is free from the effect of unwanted-order light.

It is desirable that the wavelength band limiting device should be detachable. As has already been stated above, if the wavelength band limiting device is detachable, it can be readily replaced with another. Accordingly, it is possible to obtain an image pickup apparatus capable of taking an object image of higher quality by changing the wavelength band limiting device in conformity to various imaging conditions so as to optimize the limited wavelength bands and the wavelength intensity distribution of light used.

Furthermore, the relief type diffractive optical element 2 is not necessarily limited to the one that is shown in FIG. 16, in which a flat plate-shaped substrate 6 has a relief pattern 7 formed on a surface thereof. The relief type diffractive optical element 2 may be constructed by forming a relief pattern 7 on a spherical or aspherical substrate. The relief pattern 7 is not necessarily limited to a concentric circle pattern. The relief pattern 7 may be changed in accordance with the function of the image-forming optical system. For example, when rotationally asymmetric image-forming performance is needed, the relief pattern 7 may be formed in the shape of an elliptic pattern. Alternatively, the relief pattern 7 may be formed in the shape of a parallel pattern so as to have a function equal to that of a cylindrical lens. Although in the described embodiments first-order light is used for image formation, it is also possible to use a higher order of diffracted light.

As has been stated in the description of the embodiments of the optical system, it is desirable that the wavelength band limiting device in the optical system 10 of the image pickup apparatus should satisfy at least one of the above-described conditions (1) to (4) or at least one of the conditions (5) to (8) or the condition (9). By doing so, the optical system is capable of satisfactorily reducing the effect of unwanted-order light and maintaining satisfactory color reproduction and thus forming an image of high quality. Accordingly, it is possible to obtain an image pickup apparatus capable of taking an object image of high quality and favorable color reproduction in which the effect of unwanted-order light has been reduced satisfactorily.

Although the relief type diffractive optical element 2 in this embodiment comprises the optical member 4 having a relief configuration on a surface thereof, which is formed from PMMA, and the protective layer 5 formed from λPC, the combination of the materials used for the optical member 4 and the protective layer 5 is not necessarily limited to the above. As has already been stated above, if the optical member 4 and the protective layer 5 are formed by using a combination of a material of high refractive index and high dispersion and a material of low refractive index and low dispersion in comparison to each other, it is possible to obtain an easy-to-produce and low-cost relief type diffractive optical element 2. Consequently, the image pickup apparatus becomes less costly. In addition to the combination of PMMA and PC, there are a large number of other usable combinations of materials, e.g. BSL7 and PC.

If the optical member 4 and the protective layer 5 are formed from a combination of a material of high refractive index and low dispersion and a material of low refractive index and high dispersion in comparison to each other, it is possible to reduce the wavelength dependence of the diffraction efficiency of the relief type diffractive optical element 2, and the effect of unwanted-order light can be further reduced. Furthermore, the color reproduction is further improved. Accordingly, it is possible to obtain an image pickup apparatus capable of taking an object image of higher quality. Examples of material combinations are LAL56 and PC, and BSM16 (manufactured by OHARA K. K.; $n_d$=1.62041, and $V_d$=60.3) and SAN.

Although this embodiment uses a solid-state image pickup device as an electronic image pickup device, the present invention can also effectively be applied to an arrangement in which a pickup tube is used as an electronic image pickup device. In such a case also, advantageous effects similar to the above can be obtained.

As will be clear from the foregoing description, according to the present invention, a working order of diffracted light, which is necessary for image formation, passes through a wavelength band limiting device efficiently, and unwanted orders of diffracted light, which are unnecessary for image formation, can be reduced to a considerable extent by the wavelength band limiting device. Therefore, even when the effect of unwanted-order light is increased by provision of a protective layer on the diffraction surface of the relief type diffractive optical element, it is possible to efficiently reduce the effect of unwanted-order light, i.e. flare or ghost. Accordingly, an image of high quality can be obtained. Furthermore, it is possible to obtain an optical system having excellent environmental resistance because it can incorporate the relief type diffractive optical element having a protective layer provided on the diffraction surface without degrading the image quality. Because the protective layer is provided on the diffraction surface, it is possible to place the diffraction surface on the object side when the optical system is used in a telephoto lens system of a camera, for example. Thus, the degree of design freedom increases, and the application range can be enlarged.

What is claimed is:

1. An image pickup apparatus which forms an image of an object on an electronic image pickup device by an optical system having a diffractive optical element, said optical system comprising:

a diffractive optical element; and wavelength band structure which limits a wavelength band of light entering or emerging from said diffractive optical element;

wherein said diffractive optical element includes an optical member having a pattern of grooves and projections on a surface thereof, and a protective layer formed over the surface of said optical member, said protective layer being made of a material different from a material constituting said optical member, wherein said wavelength band limiting structure includes at least a part of optical elements constituting said optical system other than said diffractive optical element, wherein at least a part of optical elements included in said wavelength band limiting means is a cover glass that protects a photoelectric conversion surface of said image pickup device.

2. An image pickup apparatus which forms an image of an object on an electronic image pickup device by an optical system having a diffractive optical element, said optical system comprising:

a diffractive optical element; and wavelength band limiting structure which limits a wavelength band of light passing through said diffractive optical element;

wherein said diffractive optical element includes an optical member having a pattern of grooves and projections on a surface thereof, and a protective layer formed over the surface of said optical member, said protective layer being made of a material different from a material constituting said optical member, wherein said electronic image pickup device is combined with a signal processor that processes an output from said electronic image pickup device to correct color information concerning said object.

3. An optical system having a diffractive optical element, said optical system comprising:

a diffractive optical element; and wavelength band limiting structure which limits a wavelength band of light passing through said diffractive optical element;

wherein said diffractive optical element includes an optical member having a pattern of grooves and projections on a surface thereof, and a protective layer formed over the surface of said optical member, said protective layer being made of a material different from a material constituting said optical member, wherein said wavelength band limiting structure includes at least a part of optical elements constituting said optical system other than said diffractive optical element, wherein said wavelength band limiting structure includes a multilayer film provided on a surface of at least a part of optical elements constituting said optical system other than said diffractive optical element.

4. An optical system having a diffractive optical element, said optical system comprising:

a diffractive optical element; and wavelength band limiting structure which limits a wavelength band of light passing through said diffractive optical element;

wherein said diffractive optical element includes an optical member having a pattern of grooves and projections on a surface thereof, and a protective layer formed over the surface of said optical member, said protective layer being made of a material different from a material constituting said optical member, wherein said optical member having a pattern of grooves and projections on a surface thereof and said protective layer, which constitute said diffractive optical element, are arranged such that one of the optical member and the protective layer comprises a material of high refractive index and high dispersion in comparison to a material comprising the other one of the optical member and the protective layer.

5. An optical system having a diffractive optical element, said optical system comprising:

a diffractive optical element; and wavelength band limiting structure which limits a wavelength band of light passing through said diffractive optical element;

wherein said diffractive optical element includes an optical member having a pattern of grooves and projections on a surface thereof, and a protective layer formed over the surface of said optical member, said protective layer being made of a material different from a material constituting said optical member, wherein said optical member having a pattern of grooves and projections on a surface thereof and said protective layer, which constitute said diffractive optical element, are arranged such that one of the optical member and the protective layer comprises a material of high refractive index and low dispersion in comparison to a material comprising the other one of the optical member and the protective layer.

6. An optical system having a diffractive optical element, said optical system comprising:

a diffractive optical element; and wavelength band limiting structure which limits a wavelength band of light passing through said diffractive optical element;

wherein said diffractive optical element includes an optical member having a pattern of grooves and projections on a surface thereof and a protective layer formed over the surface of said optical member, said protective layer being made of a material different from a material constituting said optical member, wherein said diffractive optical element has said wavelength band limiting structure, wherein said wavelength band limiting structure includes the protective layer of said diffractive optical element, and a multilayer film provided on a surface of said diffractive optical element that is reverse to a side thereof on which said protective layer is provided.

7. An image pickup apparatus which forms an image of an object on an electronic image pickup device by an optical system having a diffractive optical element, said optical system comprising:

a diffractive optical element; and wavelength band limiting structure which limits a wavelength band of light passing through said diffractive optical element;

wherein said diffractive optical element includes an optical member having a pattern of grooves and projections on a surface thereof, and a protective layer formed over the surface of said optical member, said protective layer being made of a material different from a material constituting said optical member, wherein said wavelength band limiting structure includes said diffractive optical element and at least a part of optical elements constituting said optical system other than said diffractive optical element, wherein at least a part of optical elements included in said wavelength band limiting structure is a cover glass that protects a photoelectric conversion surface of said image pickup device.

8. An image pickup apparatus comprising:

a diffractive optical element;

wavelength band limiting structure which limits a wavelength band of light passing through said diffractive optical element; and an image pickup device having a sensitivity distribution different from that of a human eye and having high sensitivity in short and long wavelength regions;

wherein said diffractive optical element has an optical member having a pattern of grooves and projections on a surface thereof, and said means for limiting a wavelength band satisfies at least one of the following conditions:

$$\lambda_S/\lambda_0 < 0.95 \quad (2)$$

$$\lambda_L/\lambda_0 > 1.2 \quad (3)$$

where:

$\lambda_0$: 510 nanometers;

$\lambda_S$: a wavelength shorter than $\lambda_0$ at which the light quantity is cut by 50%; and $\lambda_L$: a wavelength longer than $\lambda_0$ at which the light quantity is cut by 50%.

9. An optical system having a diffractive optical element, said optical system comprising:

a diffractive optical element; and wavelength band limiting structure which limits a wavelength band of light passing through said diffractive optical element;

wherein said diffractive optical element includes an optical member having a pattern of grooves and projections on a surface thereof, and a protective layer formed over the surface of said optical member, said protective layer being made of a material different from a material constituting said optical member, which satisfies at least one of the following conditions (1) to (4):

$$0 < A_0/A_a < 0.1 \quad (1)$$

$$\lambda_S/\lambda_0 < 0.95 \quad (2)$$

$$\lambda_L/\lambda_0 > 1.2 \quad (3)$$

$$|C_1 - C_2| < 20\% \text{ in a working wavelength band } \lambda_1 < \lambda < \lambda_2 \quad (4)$$

where:

$A_a$: a total light quantity in an object wavelength band;

$A_0$: a quantity of orders of diffracted light unnecessary for image formation in the object wavelength band;

$\lambda_0$: an optimization wavelength;

$\lambda_S$: a wavelength shorter than $\lambda_0$ at which the light quantity is cut by 50%;

$\lambda_L$: a wavelength longer than $\lambda_0$ at which the light quantity is cut by 50%;

$C_1$: a diffraction efficiency in % for a working order of diffracted light at the shortest wavelength $\lambda_1$ in the working wavelength band when the working order of diffracted light is optimized at the wavelength $\lambda_0$;

$C_2$: a diffraction efficiency in % for the working order of diffracted light at the longest wavelength $\lambda_2$ in the working wavelength band when the working order of diffracted light is optimized at the wavelength $\lambda_0$.

10. An optical system having a diffractive optical element according to claim 9, wherein the wavelength $\lambda_1$ is 400 nanometers, and the wavelength $\lambda_2$ is 700 nanometers.

11. An optical system having a diffractive optical element, said optical system comprising:

a diffractive optical element; and wavelength band limiting structure which limits a wavelength band of light passing through said diffractive optical element;

wherein said diffractive optical element includes an optical member having a pattern of grooves and projections on a surface thereof, and a protective layer formed over the surface of said optical member, said protective layer being made of a material different from a material constituting said optical member, which satisfies the following condition (9):

$$|C_1 - C_2| < 5\% \text{ in a working wavelength band } \lambda_1 < \lambda < \lambda_2 \quad (9)$$

where:

$C_1$: a diffraction efficiency in % for a working order of diffracted light at the shortest wavelength $\lambda_1$ in the working wavelength band when the working order of diffracted light is optimized at the wavelength $\lambda_0$;

$C_2$: a diffraction efficiency in % for the working order of diffracted light at the longest wavelength $\lambda_2$ in the working wavelength band when the working order of diffracted light is optimized at the wavelength $\lambda_0$.

12. An optical system having a diffractive optical element according to claim 11, wherein the wavelength $\lambda_1$ is 400 nanometers, and the wavelength $\lambda_2$ is 700 nanometers.

13. An optical system having a diffractive optical element, said optical system comprising:

a diffractive optical element; and wavelength band limiting structure which limits a wavelength band of light passing through said diffractive optical element;

wherein said diffractive optical element includes an optical member having a pattern of grooves and projections on a surface thereof, and a protective layer formed over the surface of said optical member, said protective layer being made of a material different from a material constituting said optical member, which satisfies at least one of the following conditions (5) to (8):

$$0 < A_0/A_a < 0.05 \quad (5)$$

$$\lambda_S/\lambda_0 < 0.94 \quad (6)$$

$$\lambda_L/\lambda_0 > 1.22 \quad (7)$$

$$|C_1 - C_2| < 10\% \text{ in a working wavelength band } \lambda_1 < \lambda < \lambda_2 \quad (8)$$

where:

$A_a$: a total light quantity in an object wavelength band;

$A_0$: a quantity of orders of diffracted light unnecessary for image formation in the object wavelength band;

$\lambda_0$: an optimization wavelength;

$\lambda_S$: a wavelength shorter than $\lambda_0$ at which the light quantity is cut by 50%;

$\lambda_L$: a wavelength longer than $\lambda_0$ at which the light quantity is cut by 50%;

$C_1$: a diffraction efficiency in % for a working order of diffracted light at the shortest wavelength $\lambda_1$ in the working wavelength band when the working order of diffracted light is optimized at the wavelength $\lambda_0$;

$C_2$: a diffraction efficiency in % for the working order of diffracted light at the longest wavelength $\lambda_2$ in the working wavelength band when the working order of diffracted light is optimized at the wavelength $\lambda_0$.

14. An optical system having a diffractive optical element according to claim 13, wherein the wavelength $\lambda_1$ is 400 nanometers, and the wavelength $\lambda_2$ is 700 nanometers.

15. An optical system, comprising:

a diffractive optical element; and wavelength band limiting structure which limits a wavelength band of light passing through said diffractive optical element;

wherein said diffractive optical element has an optical member having a pattern of grooves and projections on a surface thereof, and said wavelength band limiting structure satisfies at least one of the following conditions:

$$\lambda_S/\lambda_0 < 0.95 \quad (2)$$

$$\lambda_L/\lambda_0 > 1.2 \quad (3)$$

where:

$\lambda_0$: 510 nanometers;

$\lambda_S$: a wavelength shorter than $\lambda_0$ at which the light quantity is cut by 50%; and $\lambda_L$: a wavelength longer than $\lambda_0$ at which the light quantity is cut by 50%.

16. An optical system according to claim 15, wherein said pattern of said diffractive optical element is a concentric circle pattern.

17. An optical system on which band light is incident, said optical system comprising:

a diffractive optical element; and wavelength band limiting structure which limits a wavelength band of light passing through said diffractive optical element;

wherein said diffractive optical element has an optical member having a pattern of grooves and projections on a surface thereof, and said wavelength band limiting structure satisfies at least one of the following conditions:

$$\lambda_S/\lambda_0 < 0.94 \quad (6)$$

$$\lambda_S/\lambda_0 > 1.22 \quad (7)$$

where:

$\lambda_0$: 510 nanometers;

$\lambda_S$: a wavelength shorter than $\lambda_0$ at which the light quantity is cut by 50%; and $\lambda_L$: a wavelength longer than $\lambda_0$ at which the light quantity is cut by 50%.

18. An optical system according to claim 17, wherein said pattern of said diffractive optical element is a concentric circle pattern.

* * * * *